US012659829B2

(12) United States Patent
Krishnan et al.

(10) Patent No.: US 12,659,829 B2
(45) Date of Patent: Jun. 16, 2026

(54) DISAGGREGATED NETWORK ENTITY SIGNALING FOR NETWORK ENERGY SAVINGS CONDITIONAL HANDOVER

(71) Applicant: QUALCOMM Incorporated, San Diego, CA (US)

(72) Inventors: Shankar Krishnan, San Diego, CA (US); Naeem Akl, Bridgewater, NJ (US); Sherif Elazzouni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 582 days.

(21) Appl. No.: 18/300,232

(22) Filed: Apr. 13, 2023

(65) Prior Publication Data

US 2024/0349151 A1      Oct. 17, 2024

(51) Int. Cl.
*H04W 36/16*          (2009.01)
*H04W 36/08*          (2009.01)

(52) U.S. Cl.
CPC ......... *H04W 36/165* (2013.01); *H04W 36/08* (2013.01)

(58) Field of Classification Search
CPC .. H04W 36/165; H04W 36/08; H04W 36/362
USPC .......................................... 455/438; 370/330
See application file for complete search history.

(56) References Cited

U.S. PATENT DOCUMENTS

| | | | |
|---|---|---|---|
| 2022/0046507 A1 | 2/2022 | Krishnan et al. | |
| 2023/0388888 A1 | 11/2023 | Zhu et al. | |
| 2024/0179604 A1 | 5/2024 | Wu et al. | |
| 2025/0184855 A1 * | 6/2025 | Laselva ............. | H04W 52/0206 |

FOREIGN PATENT DOCUMENTS

| | | |
|---|---|---|
| EP | 3911018 A1 | 11/2021 |
| WO | WO-2022205336 A1 | 10/2022 |

OTHER PUBLICATIONS

International Search Report and Written Opinion—PCT/US2024/021235—ISA/EPO—Jun. 17, 2024.
(Continued)

*Primary Examiner* — Marcos Batista
(74) *Attorney, Agent, or Firm* — Holland & Hart LLP

(57) ABSTRACT

Methods, systems, and devices for wireless communications are described. The described techniques provide for a central unit (CU) and a distributed unit (DU) to communicate information for a network energy savings (NES) related conditional handover (CHO). For example, the CU, which may configure one or more user equipments (UEs) for the CHO, may indicate which UEs are configured to the DU, which may serve the UEs via Layer-1 (L1) signaling. The CU may further indicate which of the configured UEs are to perform the NES related CHO, which may be determined according to measurement reports from the configured UEs. In some examples, the DU may trigger the NES related CHO for UEs associated with measurement reports that satisfy an NES-specific threshold value, which may support the CU and the DU transitioning to the NES mode.

30 Claims, 12 Drawing Sheets

(56) References Cited

OTHER PUBLICATIONS

Qualcomm Inc: "Enhancements to Mobility Settings Change Procedure", R3-204804, 3GPP TSG-RAN WG3 Meeting #109e, 3rd Generation Partnership Project, Mobile Competence Centre, 650, Route Des Lucioles, F-06921 Sophia-Antipolis Cedex, France vol. RAN WG3, No. E-Meeting, Aug. 17, 2020-Aug. 28, 2020, Aug. 6, 2020, XP052397878, 3 Pages, Paragraph [0002], Figure 1.
3GPP: "3rd Generation Partnership Project; Technical Specification Group Radio Access Network; Study on Network Energy Savings for NR (Release 18)", 3GPP TR 38.864 V18.0.0, Dec. 2022, pp. 1-71.

* cited by examiner

Source CU
605

Source DU
610

115-c

615 — Determine to Employ NES

620 — Configuration Information

625 — First Indication

Measurement Report

630

635 — Second Indication

Measurement Report

640

645 — Third Indication

650 — CHO Trigger

655 — Transition Power States

600

710 720 715

705

700

130

105

115

Network Entity

Transceiver

1010

Antenna

1015

Communications Manager

1020

Memory

Code

1030

1025

1040

Processor

1035

1005

1000

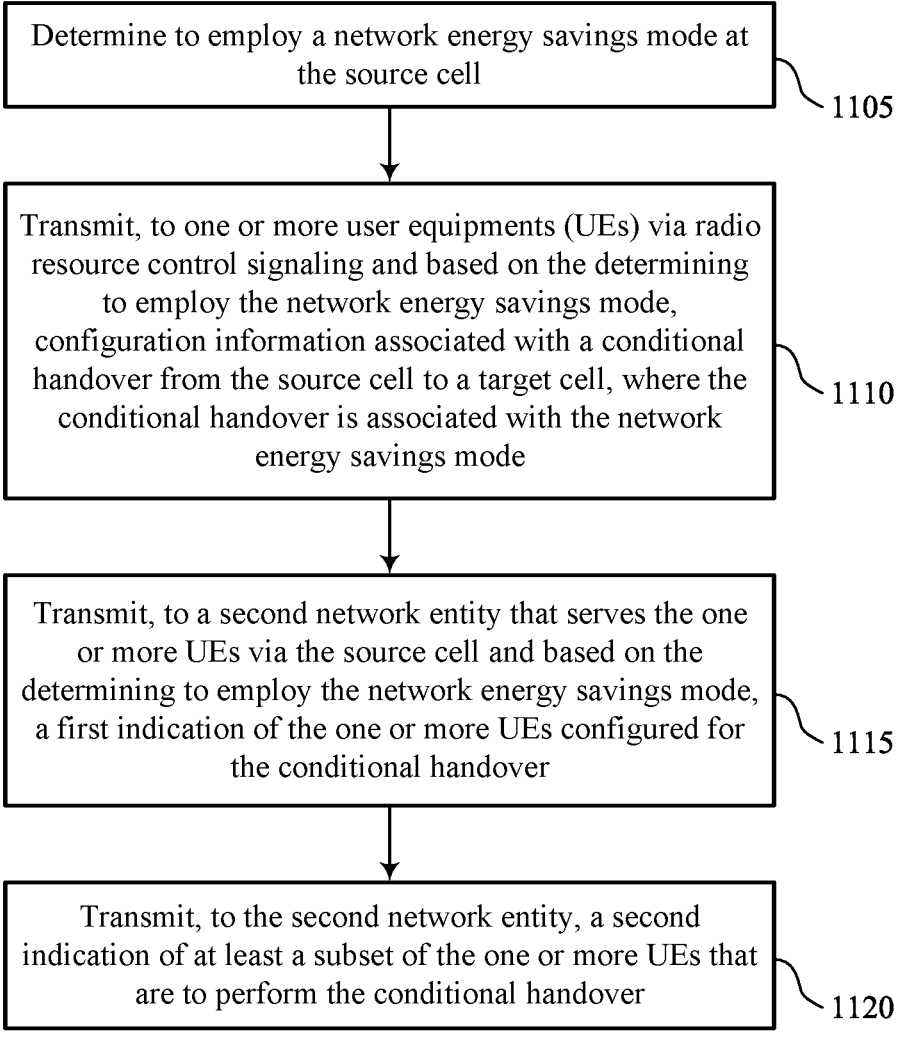

Determine to employ a network energy savings mode at the source cell

1105

Transmit, to one or more user equipments (UEs) via radio resource control signaling and based on the determining to employ the network energy savings mode, configuration information associated with a conditional handover from the source cell to a target cell, where the conditional handover is associated with the network energy savings mode

1110

Transmit, to a second network entity that serves the one or more UEs via the source cell and based on the determining to employ the network energy savings mode, a first indication of the one or more UEs configured for the conditional handover

1115

Transmit, to the second network entity, a second indication of at least a subset of the one or more UEs that are to perform the conditional handover

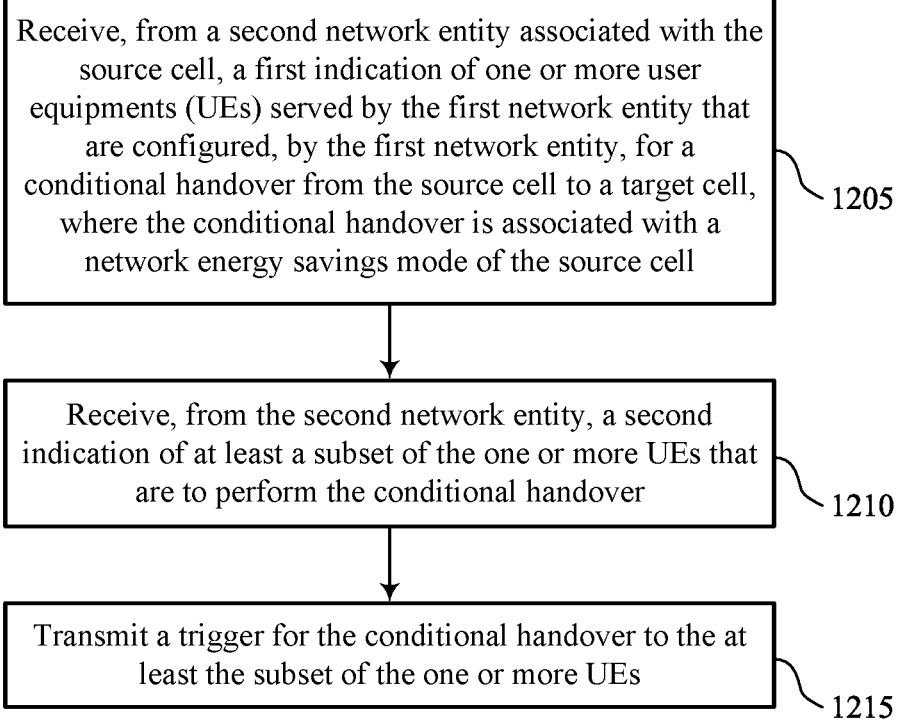

Receive, from a second network entity associated with the source cell, a first indication of one or more user equipments (UEs) served by the first network entity that are configured, by the first network entity, for a conditional handover from the source cell to a target cell, where the conditional handover is associated with a network energy savings mode of the source cell

1205

Receive, from the second network entity, a second indication of at least a subset of the one or more UEs that are to perform the conditional handover

1210

Transmit a trigger for the conditional handover to the at least the subset of the one or more UEs

DISAGGREGATED NETWORK ENTITY SIGNALING FOR NETWORK ENERGY SAVINGS CONDITIONAL HANDOVER

FIELD OF TECHNOLOGY

The following relates to wireless communications, including disaggregated network entity signaling for network energy savings conditional handover.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some cases, a network entity may perform handover procedure to transition one or more UEs served by the network entity (e.g., associated with a source cell) to the service of a different network entity (e.g., associated with a target cell). In some examples, handover of UEs served by the network entity when the network entity identifies an opportunity for entering an energy saving mode may present challenges.

SUMMARY

The described techniques relate to improved methods, systems, devices, and apparatuses that support disaggregated network entity signaling for network energy savings (NES) conditional handover (CHO). For example, the described techniques provide for a central unit (CU) and a distributed unit (DU) to communicate information for a NES related CHO. For example, the CU, which may configure one or more user equipments (UEs) that are served by a DU for the CHO, may indicate which UEs are configured for the CHO to the DU. The CU may further indicate which of the configured UEs are to perform the NES related CHO, which may be determined according to measurement reports from the configured UEs. In some examples, the DU may trigger the NES related CHO for UEs associated with measurement reports that satisfy an NES-specific threshold value, which may support the CU and the DU transitioning to the NES mode.

A method for wireless communications at a first network entity associated with a source cell is described. The method may include determining to employ a NES mode at the source cell, transmitting, to one or more UEs via radio resource control (RRC) signaling and based on the determining to employ the NES mode, configuration information associated with a CHO from the source cell to a target cell, where the CHO is associated with the NES mode, transmitting, to a second network entity that serves the one or more UEs via the source cell and based on the determining to employ the NES mode, a first indication of the one or more UEs configured for the CHO, and transmitting, to the second network entity, a second indication of at least a subset of the one or more UEs that are to perform the CHO.

An apparatus for wireless communications at a first network entity associated with a source cell is described. The apparatus may include a processor, memory coupled with the processor, and instructions stored in the memory. The instructions may be executable by the processor to cause the apparatus to determine to employ a NES mode at the source cell, transmit, to one or more UEs via RRC signaling and based on the determining to employ the NES mode, configuration information associated with a CHO from the source cell to a target cell, where the CHO is associated with the NES mode, transmit, to a second network entity that serves the one or more UEs via the source cell and based on the determining to employ the NES mode, a first indication of the one or more UEs configured for the CHO, and transmit, to the second network entity, a second indication of at least a subset of the one or more UEs that are to perform the CHO.

Another apparatus for wireless communications at a first network entity associated with a source cell is described. The apparatus may include means for determining to employ a NES mode at the source cell, means for transmitting, to one or more UEs via RRC signaling and based on the determining to employ the NES mode, configuration information associated with a CHO from the source cell to a target cell, where the CHO is associated with the NES mode, means for transmitting, to a second network entity that serves the one or more UEs via the source cell and based on the determining to employ the NES mode, a first indication of the one or more UEs configured for the CHO, and means for transmitting, to the second network entity, a second indication of at least a subset of the one or more UEs that are to perform the CHO.

A non-transitory computer-readable medium storing code for wireless communications at a first network entity associated with a source cell is described. The code may include instructions executable by a processor to determine to employ a NES mode at the source cell, transmit, to one or more UEs via RRC signaling and based on the determining to employ the NES mode, configuration information associated with a CHO from the source cell to a target cell, where the CHO is associated with the NES mode, transmit, to a second network entity that serves the one or more UEs via the source cell and based on the determining to employ the NES mode, a first indication of the one or more UEs configured for the CHO, and transmit, to the second network entity, a second indication of at least a subset of the one or more UEs that are to perform the CHO.

In some examples of the method, apparatuses, and non-transitory computer-readable medium described herein, the first indication includes a list of the one or more UEs, a flag indicating that at least one UE served by the second network entity may be configured for the CHO, an indication of the target cell, one or more groupings of the one or more UEs, a value associated with a time to perform the CHO, or any combination thereof.

In some examples of the method, apparatuses, and non-transitory computer-readable medium described herein, the configuration information indicates a first threshold value for one or more signal measurements and a second threshold value for one or more signal measurements.

Some examples of the method, apparatuses, and non-transitory computer-readable medium described herein may further include operations, features, means, or instructions for receiving one or more measurement reports associated with the one or more UEs, where the subset of the one or more UEs includes at least one UE associated with a measurement report that satisfies the first threshold value.

In some examples of the method, apparatuses, and non-transitory computer-readable medium described herein, the first threshold value may be associated with the CHO that may be associated with the NES mode and the second threshold value may be associated with a second CHO that may be not associated with the NES mode.

In some examples of the method, apparatuses, and non-transitory computer-readable medium described herein, the configuration information indicates a threshold value for one or more signal measurements and a flag indicating to delay the CHO until reception of a signal indicating to initiate the CHO.

In some examples of the method, apparatuses, and non-transitory computer-readable medium described herein, the subset of the one or more UEs may be determined based on a selection by the first network entity, one or more measurements obtained by the first network entity, or both, and the second indication includes the signal indicating to initiate the CHO.

In some examples of the method, apparatuses, and non-transitory computer-readable medium described herein, transmitting the configuration information may include operations, features, means, or instructions for transmitting, at a first time, the configuration information via the RRC signaling and transmitting, at the first time or after the first time, the first indication via an F1 interface.

Some examples of the method, apparatuses, and non-transitory computer-readable medium described herein may further include operations, features, means, or instructions for transmitting, to the second network entity, a third indication including a modification of the first indication or a cancellation of the first indication.

Some examples of the method, apparatuses, and non-transitory computer-readable medium described herein may further include operations, features, means, or instructions for transitioning from a first power state to a second power state based on transmitting the second indication, where the second power state may be the NES mode that uses less power than the first power state.

A method for wireless communications at a first network entity associated with a source cell is described. The method may include receiving, from a second network entity associated with the source cell, a first indication of one or more UEs served by the first network entity that are configured, by the first network entity, for a CHO from the source cell to a target cell, where the CHO is associated with a NES mode of the source cell, receiving, from the second network entity, a second indication of at least a subset of the one or more UEs that are to perform the CHO, and transmitting a signal indicating to initiate the CHO to the at least the subset of the one or more UEs.

An apparatus for wireless communications at a first network entity associated with a source cell is described. The apparatus may include a processor, memory coupled with the processor, and instructions stored in the memory. The instructions may be executable by the processor to cause the apparatus to receive, from a second network entity associated with the source cell, a first indication of one or more UEs served by the first network entity that are configured, by the first network entity, for a CHO from the source cell to a target cell, where the CHO is associated with a NES mode of the source cell, receive, from the second network entity, a second indication of at least a subset of the one or more UEs that are to perform the CHO, and transmit a signal indicating to initiate the CHO to the at least the subset of the one or more UEs.

Another apparatus for wireless communications at a first network entity associated with a source cell is described. The apparatus may include means for receiving, from a second network entity associated with the source cell, a first indication of one or more UEs served by the first network entity that are configured, by the first network entity, for a CHO from the source cell to a target cell, where the CHO is associated with a NES mode of the source cell, means for receiving, from the second network entity, a second indication of at least a subset of the one or more UEs that are to perform the CHO, and means for transmitting a signal indicating to initiate the CHO to the at least the subset of the one or more UEs.

A non-transitory computer-readable medium storing code for wireless communications at a first network entity associated with a source cell is described. The code may include instructions executable by a processor to receive, from a second network entity associated with the source cell, a first indication of one or more UEs served by the first network entity that are configured, by the first network entity, for a CHO from the source cell to a target cell, where the CHO is associated with a NES mode of the source cell, receive, from the second network entity, a second indication of at least a subset of the one or more UEs that are to perform the CHO, and transmit a signal indicating to initiate the CHO to the at least the subset of the one or more UEs.

In some examples of the method, apparatuses, and non-transitory computer-readable medium described herein, the first indication includes a list of the one or more UEs, a flag indicating that at least one UE served by the first network entity may be configured for the CHO, an indication of the target cell, one or more groupings of the one or more UEs a value associated with a time to perform the CHO, or any combination thereof.

In some examples of the method, apparatuses, and non-transitory computer-readable medium described herein, receiving the second indication may include operations, features, means, or instructions for receiving the second indication from the second network entity, where the subset of the one or more UEs may be determined based on a selection by the first network entity, one or more measurements obtained by the first network entity, or both, and the second indication includes the signal indicating to initiate the CHO.

In some examples of the method, apparatuses, and non-transitory computer-readable medium described herein, receiving the second indication may include operations, features, means, or instructions for receiving one or more measurement reports from the one or more UEs, where the subset of the one or more UEs includes at least one UE associated with a measurement report that satisfies a threshold value.

In some examples of the method, apparatuses, and non-transitory computer-readable medium described herein, the threshold value may be associated with a second CHO that may be not associated with the NES mode.

In some examples of the method, apparatuses, and non-transitory computer-readable medium described herein, transmitting the signal indicating to initiate the CHO may include operations, features, means, or instructions for transmitting, via a unicast channel, a respective message to each UE of the one or more UEs including the trigger, each respective message associated with a radio network temporary identifier (RNTI) for a corresponding UE and transmitting, via a groupcast channel, a message to the one or more UEs including the trigger, the message associated with a group RNTI for the one or more UEs.

Some examples of the method, apparatuses, and non-transitory computer-readable medium described herein may further include operations, features, means, or instructions for transitioning from a first power state to a second power state based on transmitting the signal indicating to initiate the CHO, where the second power state may be the NES mode that uses less power than the first power state.

BRIEF DESCRIPTION OF THE DRAWINGS

FIGS. 11 and 12 show flowcharts illustrating methods that support disaggregated network entity signaling for NES CHO in accordance with one or more aspects of the present disclosure.

DETAILED DESCRIPTION

Figure 1:
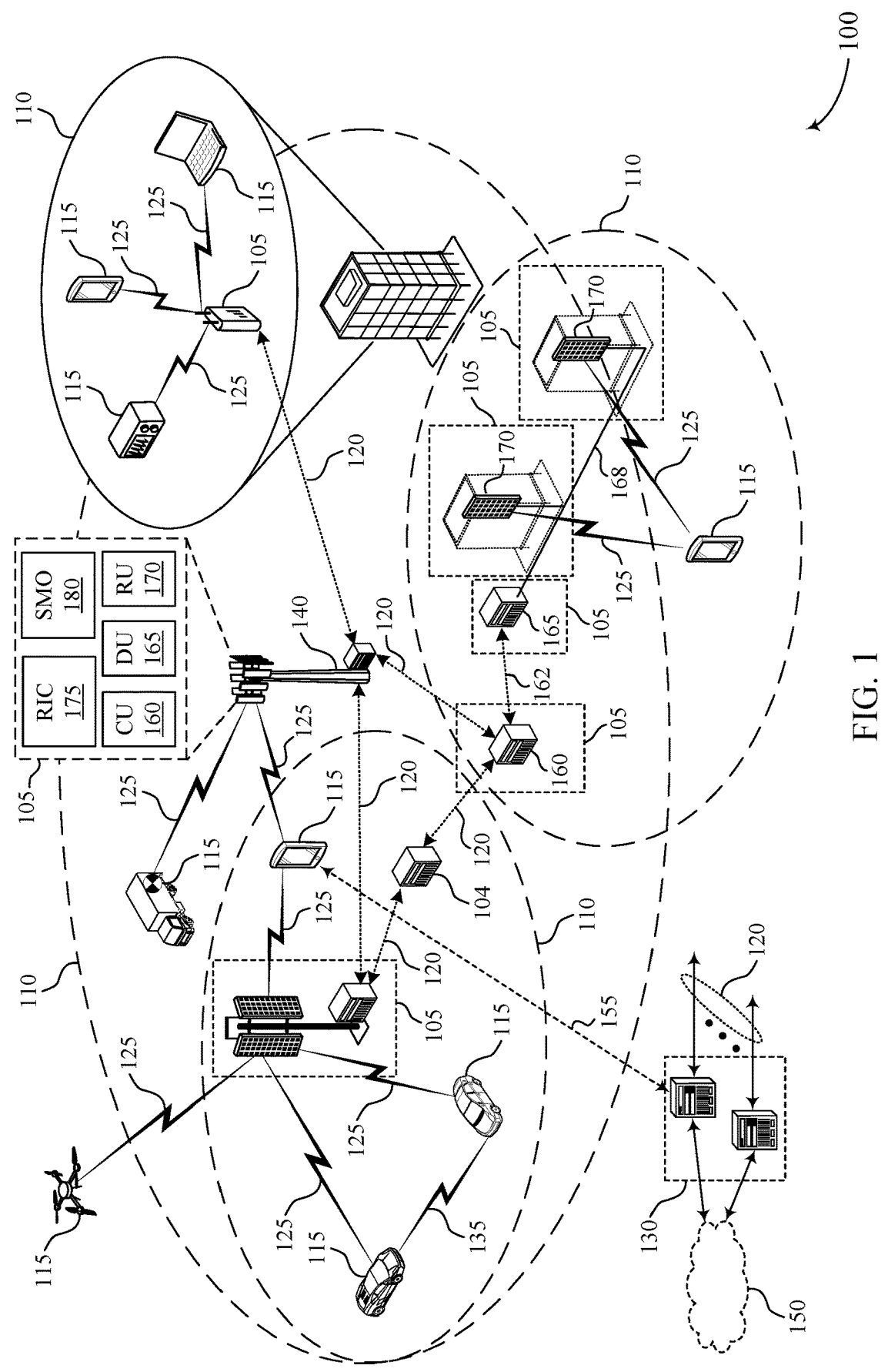
FIG. 1 shows an example of a wireless communications system that supports disaggregated network entity signaling for network energy savings (NES) conditional handover (CHO) in accordance with one or more aspects of the present disclosure.

In some wireless communications systems, a network entity may be implemented in a disaggregated architecture. For example, the network entity may include one or more central units (CUs) and one or more distributed units (DUs) associated with a same cell. In some cases, the network entity may perform a handover procedure to switch one or more user equipments (UEs) served by the network entity to service of a different network entity of a different cell. As an example, during a handover procedure, a UE may indicate channel quality measurements of one or more target cells to the source cell. In some cases, the source cell may identify a target cell that supports a better channel quality with the UE, and may initiate the handover to the target cell, which may include indicating context information associated with the UE to the target cell. In some examples, the one or more UEs may be configured (e.g., in advance) with one or more conditions and may refrain from executing the handover until the one or more conditions are satisfied. For example, a network entity of a source cell may configure one or more UEs served by the source cell with conditions for a conditional handover (CHO) to handover the one or more UEs to a target cell. Additionally, the network entity may provide the target cell with the context associated with the UE prior to the conditions for the CHO being met, and the UE may initiate the handover autonomously upon satisfying the conditions. In some cases, the network entity may initiate a CHO of the one or more UEs in order to transition to a network energy savings (NES) mode. For example, the NES mode may correspond to a reduced power state of the network entity, where one or more normal services provided by the network entity may not be supported. For example, in an NES mode, the network entity may not transmit or receive signaling, or may transmit reduced signaling (e.g., transmitting periodic synchronization signals without other reference signals, suppressing connection requests by UEs). A CHO supporting such a transition to the NES mode may be an example of an NES related CHO (e.g., a CHO associated with one or more NES specific conditions). However, a DU of the source cell, which may trigger the CHO for the one or more UEs, may be unaware of which UEs are to perform the NES related CHO, which may increase interruptions experiences by the one or more UEs during the CHO procedure.

To support performing a CHO associated with employing an NES mode, a CU and a DU of a source cell may communicate one or more messages via an F1 interface (e.g., F1 application protocol (F1AP) signaling). For example, the CU may transmit a configuration message (e.g., via radio resource control (RRC) signaling) to one or more UEs indicating one or more conditions for the NES related CHO, which may include one or more NES related conditions (e.g., an NES specific measurement threshold, a flag for reception of a signal indicating to initiate the CHO, or both), one or more CHO related conditions (e.g., a measurement threshold associated with a non-NES related CHO), or a combination thereof. Additionally, the CU may transmit a first indication of the one or more UEs that are configured for the CHO to the DU and may transmit a second indication of at least a subset of the one or more UEs that are to perform the NES related CHO (e.g., UEs that satisfy the conditions for the CHO). The DU may then transmit a signal indicating to initiate the CHO to the subset of the one or more UEs. Such communicating via the F1 interface may support the transition of source cell to the NES mode and reduce interruptions experienced by the one or more UEs during the NES related CHO.

Aspects of the disclosure are initially described in the context of wireless communications systems. Aspects of the disclosure are further illustrated by and described with reference to process flows. Aspects of the disclosure are further illustrated by and described with reference to apparatus diagrams, system diagrams, and flowcharts that relate to disaggregated network entity signaling for NES CHO.

FIG. 1 shows an example of a wireless communications system 100 that supports disaggregated network entity signaling for NES CHO in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a CU 160, a DU 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support disaggregated network entity signaling for NES CHO as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some examples, a network entity 105 may perform a CHO to transition one or more UEs 115 served by the network entity 105 (e.g., associated with a source cell) to the service of a different network entity 105 (e.g., associated with a target cell). In some examples, the CHO may be based on a determination by the network entity 105 to enter an NES mode, and the CHO may be specific to NES purposes (e.g., including one or more conditions related to transitions to the NES mode). In some cases, such as when the network entity 105 is implemented in a disaggregated architecture, a DU 165 and a CU 160 that are associated with the network entity 105 may communicate with the one or more UEs 115 to execute the CHO. However, current signaling between the DU 165 and the CU 160 may not support information related to a conditional CHO for NES (e.g., which UEs are to perform the CHO), which may reduce a reliability, an effectiveness, or both of the NES related CHO.

To support performing the NES related CHO, the CU 160 and the DU 165 may communicate one or more messages via an F1 interface (e.g., F1AP signaling). For example, the CU 160 may transmit a first indication of the one or more UEs 115 that are configured for the CHO to the DU 165 and may transmit a second indication of at least a subset of the one or more UEs 115 that are to perform the NES related CHO (e.g., UEs 115 that satisfy the conditions for the CHO). The DU 165 may then transmit a trigger to the subset of the one or more UEs 115 to execute the CHO. By communicating via the F1 interface, a reliability of the NES related CHO may be increased, which may support the source cell transitioning to the NES mode.

Figure 2:
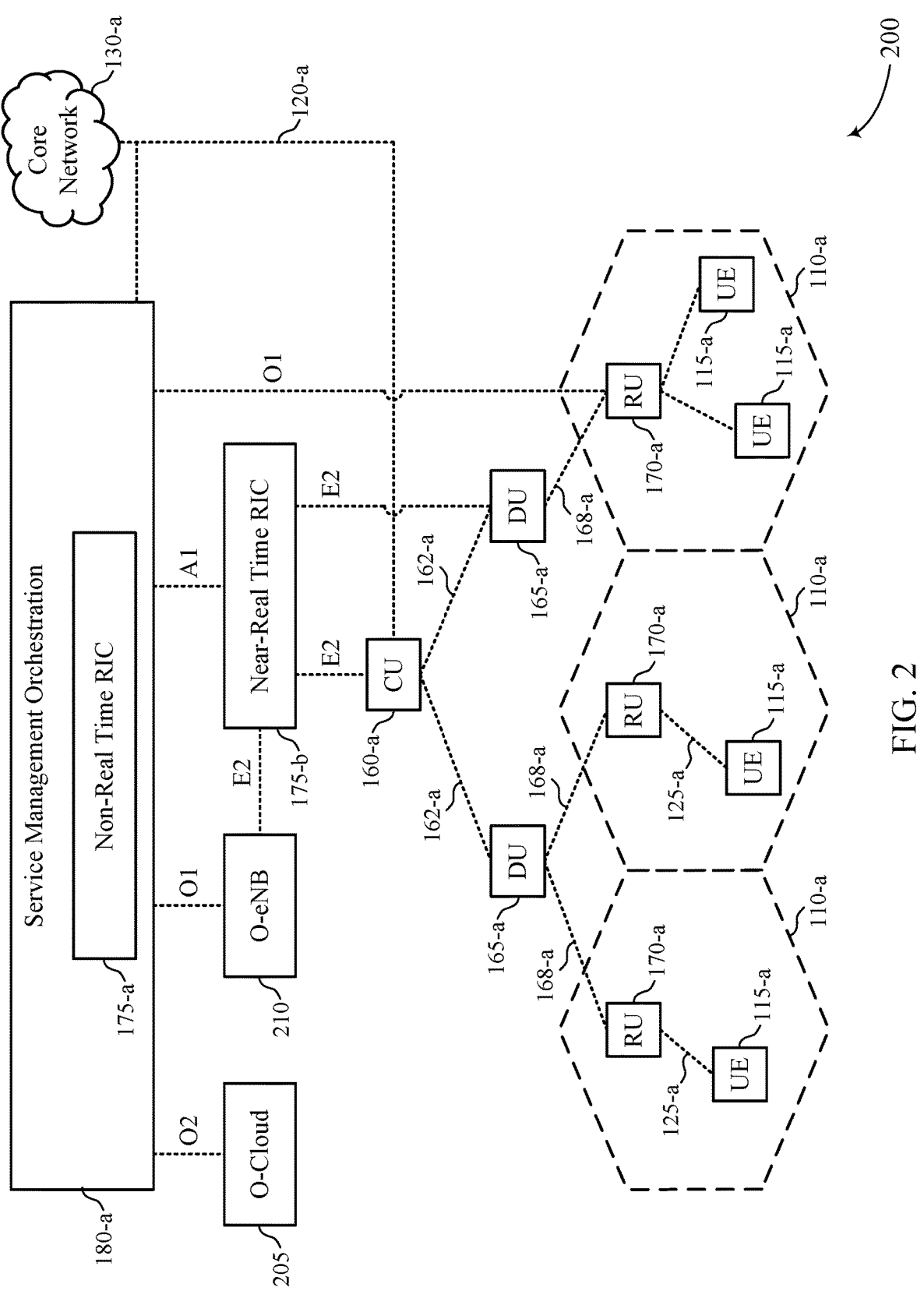
FIG. 2 shows an example of a network architecture that supports disaggregated network entity signaling for NES CHO in accordance with one or more aspects of the present disclosure.

FIG. 2 shows an example of a network architecture 200 (e.g., a disaggregated base station architecture, a disaggregated RAN architecture) that supports disaggregated network entity signaling for NES CHO in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

In some examples, to support performing an NES related CHO, the CU 160-a and the DU 165-a may communicate one or more messages via an F1 interface (e.g., F1AP signaling). For example, the CU 160-a may transmit a first indication of one or more UEs 115 that are configured for the CHO to the DU 165-a and may transmit a second indication of at least a subset of the one or more UEs 115 that are to perform the NES related CHO (e.g., UEs 115 that satisfy the conditions for the CHO). The DU 165-a may then transmit a signal indicating to initiate the CHO (e.g., a trigger) to the subset of the one or more UEs 115. By communicating via the F1 interface, a reliability of the NES related CHO may be increased, which may support the source cell transitioning to the NES mode.

Figure 3:
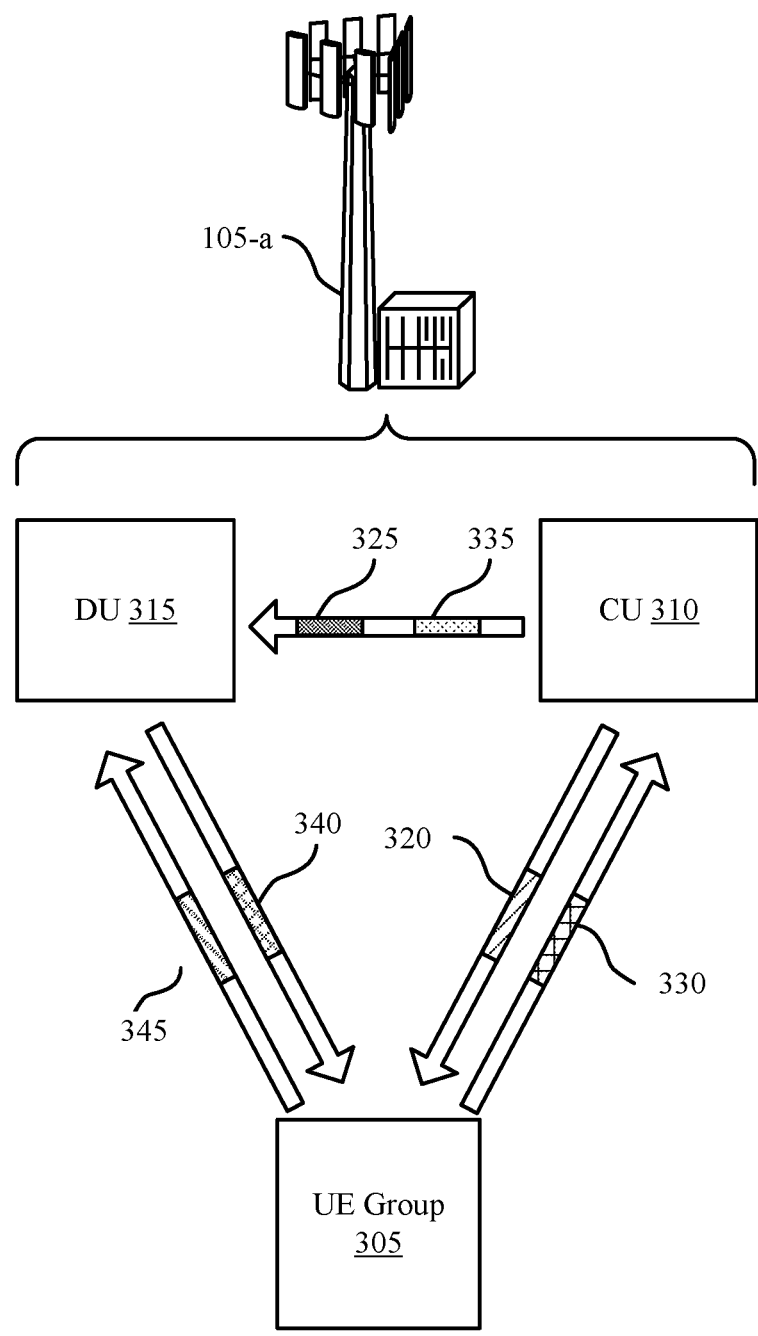
FIG. 3 shows an example of a wireless communications system that supports disaggregated network entity signaling for NES CHO in accordance with one or more aspects of the present disclosure.

FIG. 3 shows an example of a wireless communications system 300 that supports disaggregated network entity signaling for NES CHO in accordance with one or more aspects of the present disclosure. In some cases, the wireless communications system 300 may implement one or more aspects of the wireless communications system 100 and the network architecture 200. For example, the wireless communications system 300 may include a network entity 105-a and a UE group 305, which may include one or more UEs 115, which may be examples of corresponding devices described with reference to FIG. 1. In some cases, the one or more network entities 105 may be implemented in a disaggregated architecture. For example, the network entity 105-a may be associated with a CU 310 and a DU 315, which may be examples of a CU 160 and a DU 165 described with reference to FIGS. 1 and 2. For example, the CU 310 may communicate with the DU 315 via an F1 interface, and the DU 315 may serve UEs 115 via L1 signaling. The wireless communications system 300 may support a source cell associated with the network entity 105-a transitioning to an NES mode by performing an NES related CHO to hand off one or more UEs 115 of the UE group 305 to a target cell (e.g., associated with a different network entity 105).

In some cases, the UE group 305, the CU 310, the DU 315, and the network entity 105-b may communicate one or more messages to support performing the NES related CHO. Such communications may be performed using various techniques.

In a first example, the CU 310 may transmit a configuration message 320 to the UE group 305 (e.g., an RRCReconfiguration message), which may indicate one or more threshold values for performing the CHO. For example, the configuration message 320 may indicate a CHO threshold (e.g., a threshold associated with non-NES related CHOs) and an NES-specific threshold, which may be examples of a channel quality threshold (e.g., a signal-to-noise ratio (SNR) threshold) for a wireless channel between a UE 115 and the target cell. In some cases, the NES-specific threshold may be lower than the CHO threshold (e.g., indicating a less stringent channel quality constraint). For example, the NES-specific threshold may be 1 dB lower, 2 dB lower, 3 dB lower, or any another value lower than a non-NES-specific threshold. Additionally, the CU 310 may transmit a first indication to the DU 315 that indicates the one or more UEs 115 of the UE group 305 that are configured for the NES related CHO.

In some cases, one or more UEs 115 of the UE group 305 may transmit respective measurement reports 330 to the CU 310. For example, a UE 115 of the UE group 305 may transmit a measurement report 330 indicating that the UE 115 measured a channel quality that satisfies (e.g., is lower than, or lower than or equal to) the NES-specific threshold. In some cases, UEs 115 that measure a channel quality that does not satisfy the NES-specific threshold may refrain from transmitting a measurement report 330.

The CU 310 may transmit a second indication 335 to the DU 315 indicating the one or more UEs 115 that measured a channel quality that satisfies the NES-specific threshold (e.g., UEs that transmitted a measurement report 330 to the CU 310). According to the second indication 335, the DU 315 may transmit a trigger 340 for the CHO (e.g., via L1 signaling) to the one or more UEs 115 of the UE group 305 indicated in the second indication 335 (e.g., UEs 115 that are to perform the NES related CHO). Such techniques may support the execution of the NES related CHO, and are described with greater detail below with reference to FIG. 4.

In a second example, the CU 310 may transmit the configuration message 320 to the UE group 305, which may indicate a threshold value for the CHO (e.g., a single threshold to be used for CHO), a flag for reception of the trigger 340, or both. For example, a UE 115 that receives the configuration message 320 may measure a channel quality that satisfies the threshold value and may refrain from executing the CHO until receiving the trigger 340 based on the flag. Additionally, the CU 310 may transmit the first indication 325 to the DU 315 that indicates the one or more UEs 115 of the UE group 305 that are configured for the NES related CHO.

In some cases, the CU 310 may transmit the second indication 335 to the DU 315 indicating one or more UEs 115 of the UE group 305 that are to perform the NES related CHO (e.g., UEs 115 determined from a blind selection by the CU 310, L3 measurements collected by the CU 310, or both). Additionally, or alternatively, one or more UEs 115 of the UE group 305 may transmit respective measurement reports 345 to the DU 315. For example, a UE 115 of the UE group 305 may transmit a measurement report 345 based on measuring a channel quality that satisfies the configured threshold value (e.g., the NES related CHO threshold).

In some examples, the DU 315 may transmit the trigger 340 (e.g., a signal indicating to initiate the NES related CHO) to one or more UEs 115 of the UE group 305 according to the second indication 335, the measurement reports 345, or both. For example, the DU 315 may transmit the trigger 340 to the one or more UEs 115 indicated in the second indication 335, the one or more UEs 115 that transmitted the measurement repots 345, or a combination thereof. Such techniques may support the execution of the NES related CHO and are described with greater detail below with reference to FIG. 5.

Figure 4:
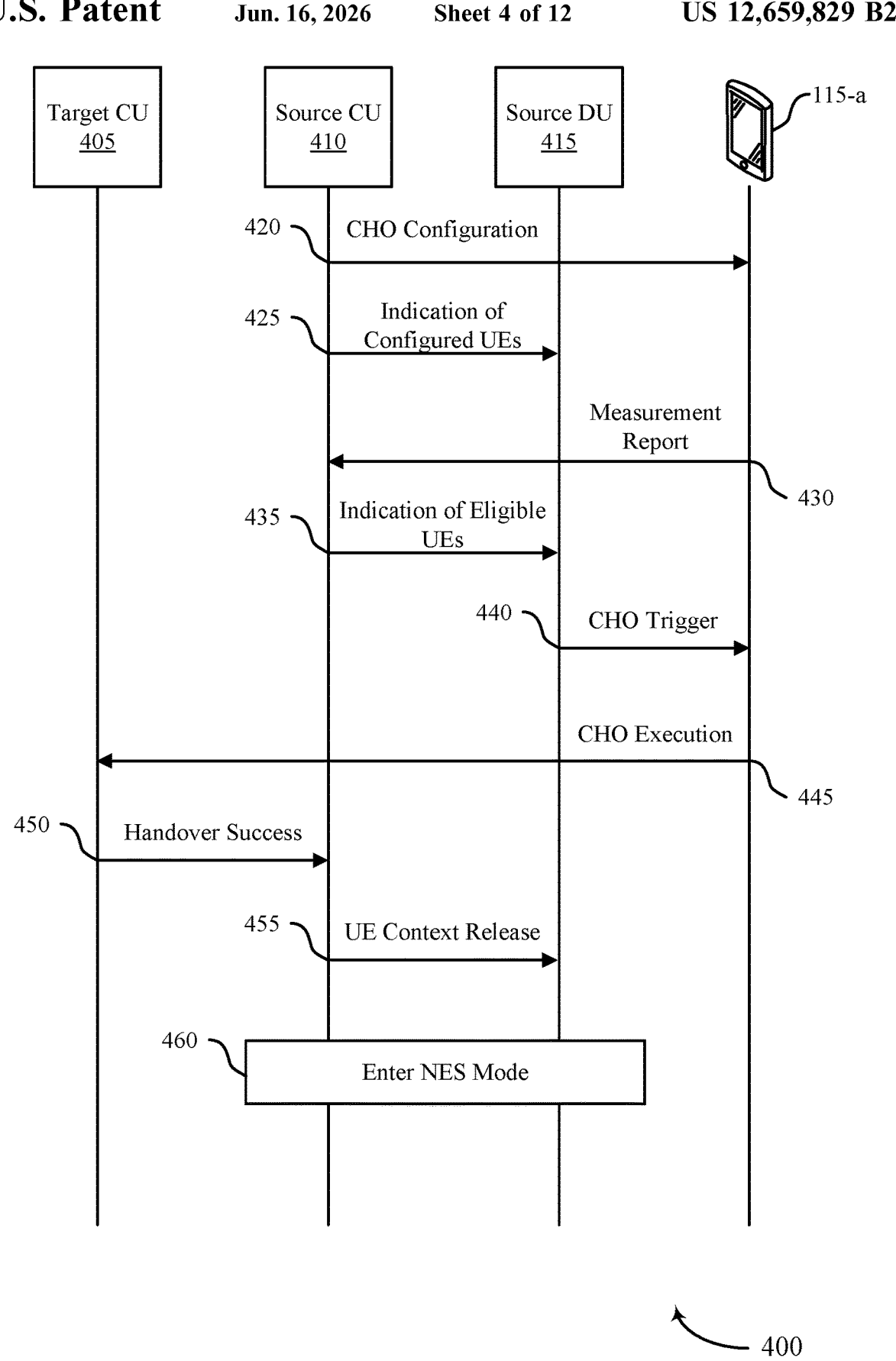
FIG. 4 shows an example of a process flow that supports disaggregated network entity signaling for NES CHO in accordance with one or more aspects of the present disclosure.

FIG. 4 shows an example of a process flow 400 that supports disaggregated network entity signaling for NES CHO in accordance with one or more aspects of the present disclosure. The process flow 400 may be implemented by one or more aspects of the wireless communications system 100, the network architecture 200, and the wireless communications system 300. For example, the process flow 400 may illustrate communications between a target CU 405 (e.g., a CU associated with a target cell of a handover), a source CU 410 (e.g., a CU associated with a source cell of a handover), a source DU 415, and a UE 115-a, which may be examples of corresponding devices described with reference to FIGS. 1, 2, and 3.

In some cases, the process flow 400 may be associated with a first example of signaling techniques that support performing an NES related CHO to transition the UE 115-a from the service of a source cell to the service of a target cell. In some cases, the UE 115-a may be part of a group of UEs 115 that are served by the source cell, and communications performed by the UE 115-a may be extended to the group of UEs 115. Alternative examples of the following may be implemented, where some processes are performed in a different order than described or are not performed. In some cases, processes may include additional features not mentioned below, or further processes may be added.

At 420, the source CU 410 may transmit, to the UE 115-*a*, a CHO configuration. For example, the source CU 410 may transmit the CHO configuration via RRC signaling to a group of UEs 115 including the UE 115-*a*. In some cases, the CHO configuration may indicate one or more threshold values associated with performing an NES related CHO. For example, the CHO configuration may indicate a CHO threshold (e.g., a threshold associated with non-NES related CHOs) and an NES-specific threshold, which may be examples of a channel quality threshold (e.g., a SNR threshold). In some cases, the NES-specific threshold may be lower than the CHO threshold (e.g., indicating a less stringent channel quality constraint).

At 425, the source CU 410 may transmit, to the source DU 415, an indication (e.g., a first indication) of the configured UEs 115. For example, the source CU 410 may indicate, to the source DU 415 via F1AP signaling, the UEs 115 that are configured for the NES related CHO (e.g., including the UE 115-*a*). In some cases, the indication may include a list of the one or more UEs 115, a flag (e.g., a one bit indication) indicating that there are UEs 115 served by the source DU 415 configured for the NES related CHO (e.g., without specifying the list of the UEs 115), an indication of the target cell for the NES related CHO, one or more groupings of the UEs 115 (e.g., indicating which UEs 115 are to perform the NES related CHO together), an indication of a time to perform the NES related CHO (e.g., a time to trigger the CHO), or any combination thereof.

In some cases, the indication may be transmitted to the source DU 415 (e.g., via the F1 interface) at a same time as transmitting the CHO configuration to the UEs 115 (e.g., via RRC signaling), or may be transmitted after (e.g., directly after) transmitting the CHO configuration. In some examples, the indication may be transmitted via an existing F1AP message or may be transmitted via a new F1AP message (e.g., defined for communications associated with the NES related CHO). In some cases, the source DU 415 may maintain the indication and the source CU 410 may be operable to modify or cancel the indication, if appropriate (e.g., based on conditions related to an NES mode).

At 430, the UE 115-*a* may transmit a measurement report to the source CU 410. In some cases, the UE 115-*a* may measure a wireless channel (e.g., a wireless channel associated with the target cell) and may generate a measurement report if the measurement satisfies the NES-specific threshold. For example, the UE 115-*a* may measure a channel quality that satisfies the NES-specific threshold and fails to satisfy the CHO threshold, and may indicate that the NES-specific threshold has been satisfied to the source CU 410 via the measurement report. In some cases, if the UE 115-*a* measures a channel quality that fails to satisfy the NES-specific threshold, the UE 115-*a* may refrain from transmitting a measurement report. Additionally, or alternatively, if the UE 115-*a* measures a channel quality that satisfies the CHO threshold, the UE 115-*a* may execute the CHO to the target cell (e.g., without receiving a CHO trigger).

At 435, the source CU 410 may transmit, to the source DU 415 via the F1 interface, an indication (e.g., a second indication) of at least a subset of the one or more configured UEs 115 that are eligible for the NES related CHO. For example, the subset of the one or more configured UEs 115 may include the UE 115-*a* that transmitted a measurement report to the source CU 410 (e.g., due to satisfying the NES-specific threshold) and may indicate one or more UEs 115 that are to perform the NES related CHO. In some cases, the indication may be transmitted via an existing F1AP message or may be transmitted via a new F1AP message (e.g., defined for communications associated with the NES related CHO).

At 440, the source DU 415 may transmit a CHO trigger (e.g., a signal indicating to initiate the NES related CHO) to the subset of the one or more UEs 115. For example, the DU 415 may transmit, via L1 (or L2) signaling, the CHO trigger to the UE 115-*a* based on the CU 410 indicating the UE 115-*a* at 435. In some cases, the CHO trigger may be transmitted via a unicast channel. For example, the source DU 415 may transmit a respective message to each eligible UE 115 (e.g., UEs 115 indicated at 435) indicating the CHO trigger, where each respective message may be associated with a radio network temporary identifier (RNTI) for a corresponding UE 115 (e.g., an existing RNTI or a newly configured RNTI). Additionally, or alternatively, the CHO trigger may be transmitted via a groupcast channel. For example, the source DU 415 may transmit a single message to the eligible UEs 115 indicating the CHO trigger, where the message may be associated with a group RNTI (G-RNTI). In such an example, the source CU 410 may configure the UEs 115 with the G-RNTI (e.g., via RRC). In some cases, the source CU 410 may select the G-RNTI and indicate the G-RNTI to the source DU 415, or the source DU 415 may generate the G-RNTI for a group of UEs 115 according to a request from the source CU 410 and may indicate the G-RNTI to the source CU 410.

At 445, the one or more eligible UEs 115 (e.g., including the UE 115-*a*) may execute the NES related CHO. For example, the UE 115-*a* may measure a channel quality that satisfies the NES-specific threshold and may execute the CHO after receiving the CHO trigger or after measuring a channel quality that satisfies the CHO threshold. In some examples, the UE 115-*a* may transmit a message (e.g., RRCReconfigurationComplete) to the target CU 405 indicating the CHO execution. By executing the CHO, the UE 115-*a* may transition from service of the source cell to service of the target cell.

At 450, the target CU 405 may indicate, to the source CU 410, that the CHO was successful.

At 455, the source CU 410 may transmit, to the source DU 415, a UE context release message, which may indicate that the source DU 415 is to stop serving the one or more UEs 115 that executed the NES related CHO.

At 460, the source CU 410 and the source DU 415 may transition to the NES mode. In some cases, the source CU 410 and the source DU 415 may consume less power based on transitioning to the NES mode.

Figure 5:
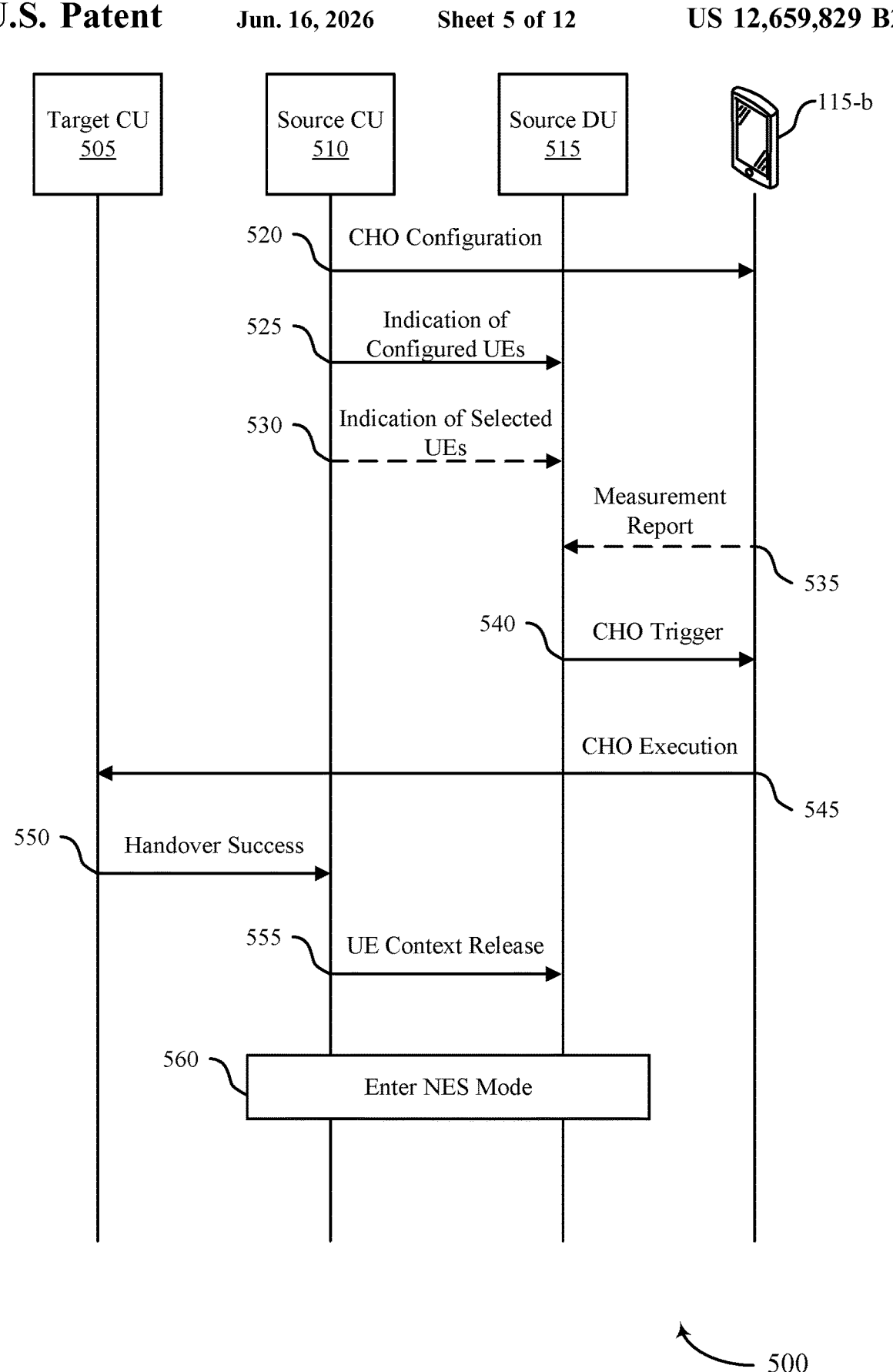
FIG. 5 shows an example of a process flow that supports disaggregated network entity signaling for NES CHO in accordance with one or more aspects of the present disclosure.

FIG. 5 shows an example of a process flow 500 that supports disaggregated network entity signaling for NES CHO in accordance with one or more aspects of the present disclosure. The process flow 500 may be implemented by one or more aspects of the wireless communications system 100, the network architecture 200, and the wireless communications system 300. For example, the process flow 500 may illustrate communications between a target CU 505 (e.g., a CU associated with a target cell of a handover), a source CU 510 (e.g., a CU associated with a source cell of a handover), a source DU 515, and a UE 115-*b*, which may be examples of corresponding devices described with reference to FIGS. 1, 2, and 3.

In some cases, the process flow 500 may be associated with a second example of signaling techniques that support performing an NES related CHO to transition the UE 115-*b* from the service of a source cell to the service of a target cell. In some cases, the UE 115-*b* may be part of a group of UEs 115 that are served by the source cell, and communications performed by the UE 115-*b* may be extended to the group of UEs 115. Alternative examples of the following may be implemented, where some processes are performed in a different order than described or are not performed. In some cases, processes may include additional features not mentioned below, or further processes may be added.

At 520, the source CU 510 may transmit, to the UE 115-*b*, a CHO configuration. For example, the source CU 510 may transmit the CHO configuration via RRC signaling to a group of UEs 115 including the UE 115-*b*. In some cases, the CHO configuration may indicate a threshold value for one or more signal measurements and a flag for reception of a CHO trigger. For example, the CHO configuration may indicate that the UE 115-*b* is to execute the NES related CHO if the UE 115-*b* measures a channel quality that satisfies the threshold value (e.g., an NES-specific threshold or a threshold associated with other CHO procedures) and if the UE 115-*b* receives a trigger for the CHO. In some cases, the UE 115-*b* may delay executing the CHO until receiving the trigger (e.g., despite measuring a channel quality that satisfies the threshold value) due to the flag for reception of the trigger configured by the source CU 510.

At 525, the source CU 510 may transmit, to the source DU 515, an indication (e.g., a first indication) of the configured UEs 115. For example, the source CU 510 may indicate, to the source DU 515 via F1AP signaling, the UEs 115 that are configured for the NES related CHO (e.g., including the UE 115-*b*). In some cases, the indication may include a list of the one or more UEs 115, a flag (e.g., a one bit indication) indicating that there are UEs 115 served by the source DU 515 and configured for the NES related CHO (e.g., without specifying the list of the UEs 115), an indication of the target cell for the NES related CHO, one or more groupings of the UEs 115 (e.g., indicating which UEs 115 are to perform the NES related CHO together), an indication of a time to perform the NES related CHO (e.g., a time to trigger the CHO), or any combination thereof.

In some cases, the indication may be transmitted to the source DU 515 (e.g., via the F1 interface) at a same time as transmitting the CHO configuration to the UEs 115 (e.g., via RRC signaling), or may be transmitted after (e.g., directly after) transmitting the CHO configuration. In some examples, the indication may be transmitted via an existing F1AP message or may be transmitted via a new F1AP message (e.g., defined for communications associated with the NES related CHO). In some cases, the source DU 515 may maintain the indication and the source CU 510 may be operable to modify or cancel the indication.

At 530, the source CU 510 may transmit, to the source DU 515 via the F1 interface, an indication (e.g., a second indication) of at least a subset of the one or more UEs 115 that are to perform the NES related CHO. In some cases, the source CU 510 may select (e.g., blindly select) the subset of the one or more UEs 115. Additionally, or alternatively, the source CU 510 may identify the subset of the one or more UEs 115 according to one or more measurements collected by the source CU 510 (e.g., L3 measurements). In some cases, the indication may include a request that the source DU 515 transmit a CHO trigger to the subset of the one or more UEs 115 (e.g., to trigger execution of the CHO for the selected UEs 115).

At 535, the source DU 515 may receive one or more measurement reports from the one or more UEs 115 configured for the NES related CHO. For example, the UE 115-*b* may measure a quality of a wireless channel (e.g., a wireless channel associated with the target cell) and may transmit a measurement report indicating the channel quality measurement to the source DU 515 (e.g., via L1 signaling). In some cases, the source DU 515 may identify at least a subset of the one or more UEs 115 that are to perform the NES related CHO according to the one or more measurement reports. For example, the subset of the one or more UEs 115 may include UEs 115 that measured a channel quality that satisfies the configured threshold value. In some cases, the one or more measurement reports may be communicated as an alternative to the source CU 510 indicating the selected UEs 115 (e.g., at 530).

At 540, the source DU 515 may transmit the CHO trigger (e.g., a signal indicating to initiate the NES related CHO) to the subset of the UEs 115 that are to perform the NES related CHO. In some cases, the source DU 515 may identify the subset of the UEs 115 according to the indication of the selected UEs received from the source CU 510 (e.g., at 530), according to the one or more measurement reports received from the UEs 115 (e.g., at 535), or a combination thereof. In some cases, receiving the CHO trigger may satisfy the flag for reception of the trigger (e.g., configured by the source CU 510).

In some cases, the CHO trigger may be transmitted via a unicast channel. For example, the source DU 515 may transmit a respective message to each UE 115 of the subset of UEs 115 indicating the CHO trigger, where each respective message may be associated with a RNTI for a corresponding UE 115 (e.g., an existing RNTI or a newly configured RNTI). Additionally, or alternatively, the CHO trigger may be transmitted via a groupcast channel. For example, the source DU 515 may transmit a single message to the subset of the UEs 115 indicating the CHO trigger, where the message may be associated with a G-RNTI. In such an example, the source CU 510 may configure the UEs 115 with the G-RNTI (e.g., via RRC). In some cases, the source CU 510 may select the G-RNTI and indicate the G-RNTI to the source DU 515, or the source DU 515 may generate the G-RNTI for a group of UEs 115 according to a request from the source CU 510 and may indicate the G-RNTI to the source CU 510.

At 545, the subset of the one or more UEs 115 may execute the NES related CHO after receiving the CHO trigger. For example, the UE 115-*b* may identify that each condition of the NES related CHO is satisfied (e.g., measuring a channel quality that satisfies the threshold value and reception of the CHO trigger), and may execute the NES related CHO to transition from the service of the source cell to the service of the target cell (e.g., associated with the target CU 505). In some examples, the UE 115-*b* may transmit a message (e.g., RRCReconfigurationComplete) to the target CU 505 indicating the CHO execution.

At 550, the target CU 505 may indicate, to the source CU 510, that the CHO was successful.

At 555, the source CU 510 may transmit, to the source DU 515, a UE context release message, which may indicate that the source DU 515 is to stop serving the one or more UEs 115 that executed the NES related CHO.

At 560, the source CU 510 and the source DU 515 may transition to the NES mode. In some cases, the source CU 510 and the source DU 515 may consume less power based on transitioning to the NES mode.

Figure 6:
FIG. 6 shows an example of a process flow that supports disaggregated network entity signaling for NES CHO in accordance with one or more aspects of the present disclosure.

FIG. 6 shows an example of a process flow 600 that supports disaggregated network entity signaling for NES CHO in accordance with one or more aspects of the present disclosure. The process flow 600 may be implemented by one or more aspects of the wireless communications system 100, the network architecture 200, and the wireless communications system 300. For example, the process flow 400 may illustrate communications a source CU 605, a source DU 610, and a UE 115-*c*, which may be examples of corresponding devices described with reference to FIGS. 1, 2, and 3. In some cases, the UE 115-*c* may be part of a group of UEs 115 that are served by the source cell, and communications performed by the UE 115-*c* may be extended to the group of UEs 115. Alternative examples of the following may be implemented, where some processes are performed in a different order than described or are not performed. In some cases, processes may include additional features not mentioned below, or further processes may be added.

At 615, the source CU 605 may determine to employ an NES mode at a source cell (e.g., associated with the source CU 605), which may support a reduced power consumption of the source cell. For example, the source CU 605 may determine to employ the NES mode based on a current time (e.g., during inactive hours). Additionally, or alternatively, the source CU 605 may receive a request from a different network entity 105 to employ the NES mode.

At 620, the source CU 605 may transmit, to one or more UEs 115 (e.g., including the UE 115-*c*) via RRC signaling, configuration information associated with CHO from the source cell to a target cell, where the CHO may be associated with the NES mode (e.g., an NES related CHO). In some examples, the configuration information may indicate a first threshold value for one or more signal measurements (e.g., an NES-specific threshold) and a second threshold value for one or more signal measurements (e.g., a CHO threshold that is not specific to NES purposes). In some cases, the first threshold value may be less than the second threshold value (e.g., indicating a less stringent measurement constraint). In some other examples, the configuration information may indicate a single threshold value (e.g., an NES-specific threshold or a CHO threshold that is not specific to NES purposes) and a flag indicating to delay the CHO until reception of a trigger for the CHO.

At 625, the source CU 605 may transmit, to the source DU 610 that serves the one or more UEs 115 via the source cell, a first indication of the one or more UEs 115 that are configured for the CHO. In some examples, the first indication may include a list of the one or more UEs 115, a flag (e.g., a one bit indication) indicating that there are UEs 115 served by the source DU 610 and configured for the NES related CHO (e.g., without specifying the list of the UEs 115), an indication of the target cell for the NES related CHO, one or more groupings of the UEs 115 (e.g., indicating which UEs 115 are to perform the NES related CHO together), an indication of a time to perform the NES related CHO (e.g., a time to trigger the CHO), or any combination thereof. In some cases, the source CU 605 may transmit the first indication to the source DU 610 via an F1 interface. In some cases, the source CU 605 may transmit the configuration information via RRC at a first time and may transmit the first indication via the F1 interface at the first time or after the first time.

At 630, the source CU 605 may receive one or more measurement reports associated with the one or more UEs 115. For example, if the configuration information includes the first threshold value and the second threshold value, the source CU 605 may receive measurement reports from at least one UE 115 that measure a channel quality that satisfies the first threshold value (e.g., the NES-specific threshold value).

At 635, the source CU 605 may transmit, to the source DU 610, a second indication of at least a subset of the one or more UEs 115 that are to perform the CHO. In some examples, the subset of the one or more UEs 115 may include at least one UE 115 associated with a measurement report that satisfies the first threshold value. Additionally, or alternatively, the subset of the one or more UEs 115 may be selected (e.g., blindly selected) by the source CU 605 or determined according to one or more measurements collected by the source CU 605 (e.g., L3 measurements). In such an example, the second indication may include the trigger for the CHO (e.g., requesting that the source DU 610 transmit the trigger to the indicated UEs 115).

At 640, the source DU 610 may receive one or more measurement reports form the one or more UEs 115 configured for the NES related CHO. For example, if the configuration information includes the single threshold value and the flag for reception of the CHO trigger, the source DU 610 may identify the subset of the one or more UEs 115 that are to perform the CHO according to the one or more measurement reports. In some cases, the subset of the one or more UEs 115 may include at least one UE associated with a measurement report that satisfies the threshold value. In some cases, the source DU 610 may receive the one or more measurement reports via L1 signaling.

At 645, the source CU 605 may transmit, to the source DU 610, a third indication including a modification of the first indication or a cancellation of the first indication. For example, the source DU 610 may maintain the first indication, and the source CU 605 may modify the first indication (e.g., updating the list of the configured UEs 115) or cancel the first indication via the third indication.

At 650, the source DU 610 may transmit a trigger for the CHO to at least the subset of the one or more UEs 115. For example, the source DU 610 may transmit, via L1 (or L2) signaling, the CHO trigger to the subset of the one or more UEs 115 based on receiving the second indication, receiving the one or more measurement reports, or a combination thereof. In some cases, the source DU 610 may transmit the CHO trigger via a unicast channel. For example, the source DU 610 may transmit a respective message to each UE 115 of the subset of the one or more UEs 115 indicating the CHO trigger, where each respective message may be associated with a RNTI for a corresponding UE 115 (e.g., an existing RNTI or a newly configured RNTI). Additionally, or alternatively, the source DU 610 may transmit the CHO via a groupcast channel. For example, the source DU 610 may transmit a single message to the eligible UEs 115 indicating the CHO trigger, where the message may be associated with a G-RNTI. In such an example, the source CU 605 may configure the UEs 115 with the G-RNTI (e.g., via RRC). In some cases, the source CU 605 may select the G-RNTI and indicate the G-RNTI to the source DU 610, or the source DU 610 may generate the G-RNTI for a group of UEs 115 according to a request from the source CU 605 and may indicate the G-RNTI to the source CU 605.

At 655, the source CU 605 and the source DU 610 may transition from a first power state to a second power state. In some cases, the second power state may be the NES mode, which may use less power than the first power state. In some examples, the transition may be based on transmitting the CHO trigger and the one or more UEs 115 executing the NES related CHO.

Figure 7:
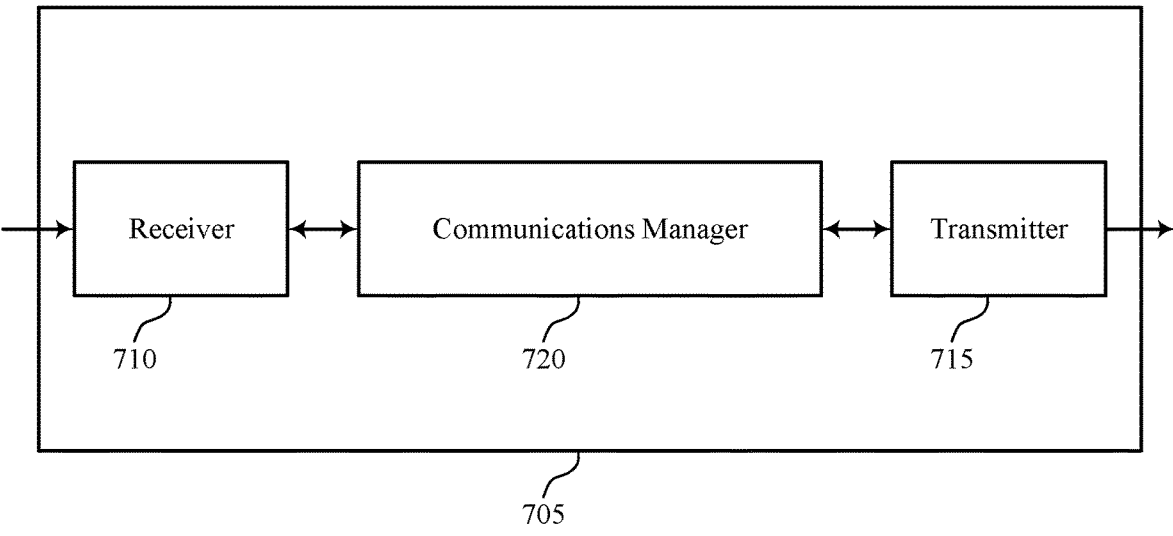
FIGS. 7 and 8 show block diagrams of devices that support disaggregated network entity signaling for NES CHO in accordance with one or more aspects of the present disclosure.

FIG. 7 shows a block diagram 700 of a device 705 that supports disaggregated network entity signaling for NES CHO in accordance with one or more aspects of the present disclosure. The device 705 may be an example of aspects of a network entity 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some examples, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The communications manager 720, the receiver 710, the transmitter 715, or various combinations thereof or various components thereof may be examples of means for performing various aspects of disaggregated network entity signaling for NES CHO as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a first network entity associated with a source cell in accordance with examples as disclosed herein. For example, the communications manager 720 is capable of, configured to, or operable to support a means for determining to employ a NES mode at the source cell. The communications manager 720 is capable of, configured to, or operable to support a means for transmitting, to one or more UEs via RRC signaling and based on the determining to employ the NES mode, configuration information associated with a CHO from the source cell to a target cell, where the CHO is associated with the NES mode. The communications manager 720 is capable of, configured to, or operable to support a means for transmitting, to a second network entity that serves the one or more UEs via the source cell and based on the determining to employ the NES mode, a first indication of the one or more UEs configured for the CHO. The communications manager 720 is capable of, configured to, or operable to support a means for transmitting, to the second network entity, a second indication of at least a subset of the one or more UEs that are to perform the CHO.

Additionally, or alternatively, the communications manager 720 may support wireless communications at a first network entity associated with a source cell in accordance with examples as disclosed herein. For example, the communications manager 720 is capable of, configured to, or operable to support a means for receiving, from a second network entity associated with the source cell, a first indication of one or more UEs served by the first network entity that are configured, by the second network entity, for a CHO from the source cell to a target cell, where the CHO is associated with a NES mode of the source cell. The communications manager 720 is capable of, configured to, or operable to support a means for receiving, from the second network entity, a second indication of at least a subset of the one or more UEs that are to perform the CHO. The communications manager 720 is capable of, configured to, or operable to support a means for transmitting a signal indicating to initiate the CHO to the at least the subset of the one or more UEs.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced power consumption and a robust handover procedure.

Figure 8:
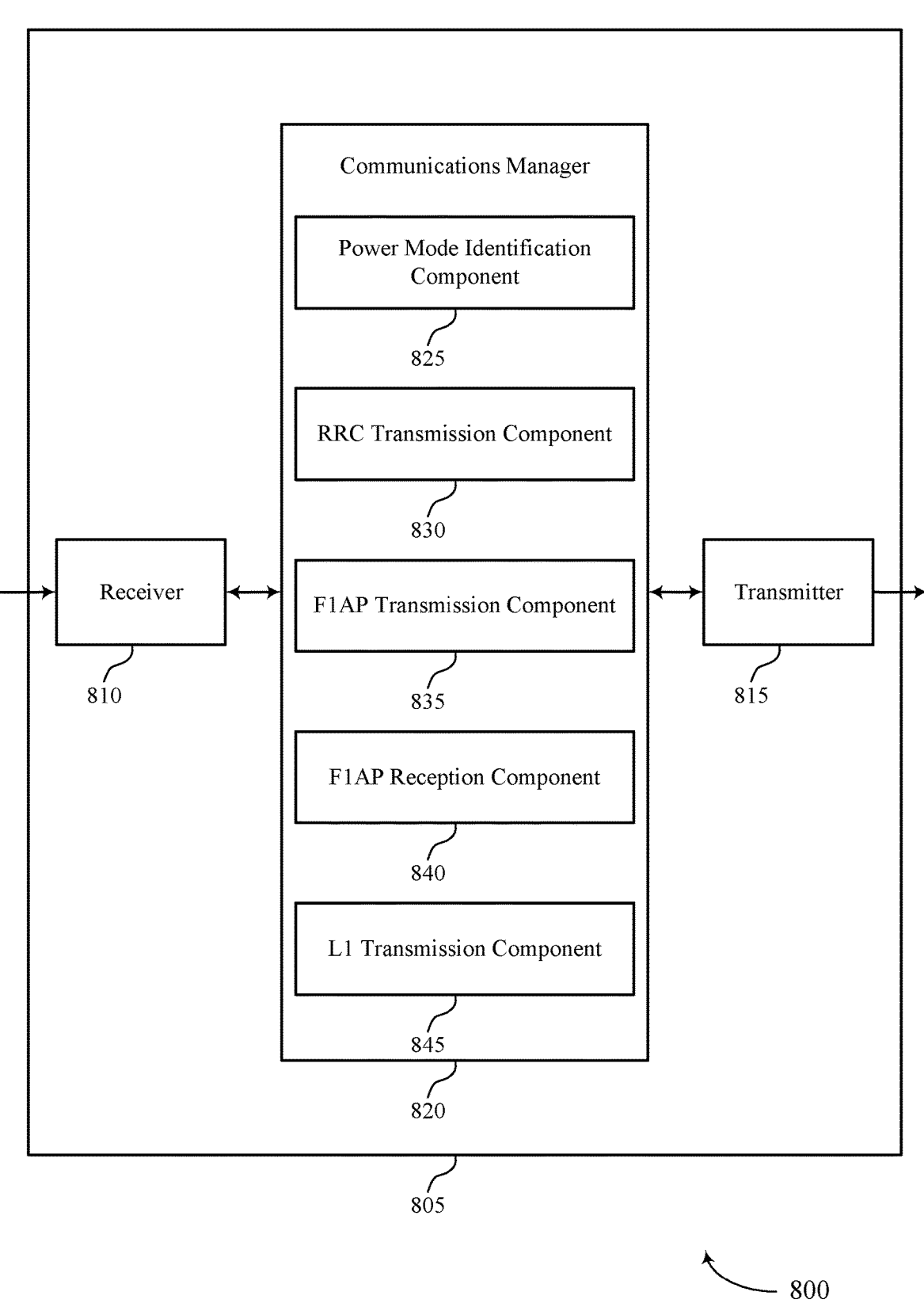

FIG. 8 shows a block diagram 800 of a device 805 that supports disaggregated network entity signaling for NES CHO in accordance with one or more aspects of the present disclosure. The device 805 may be an example of aspects of a device 705 or a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The device 805, or various components thereof, may be an example of means for performing various aspects of disaggregated network entity signaling for NES CHO as described herein. For example, the communications manager 820 may include a power mode identification component 825, an RRC transmission component 830, a F1AP transmission component 835, a F1AP reception component 840, a L1 transmission component 845, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a first network entity associated with a source cell in accordance with examples as disclosed herein. The power mode identification component 825 is capable of, configured to, or operable to support a means for determining to employ a NES mode at the source cell. The RRC transmission component 830 is capable of, configured to, or operable to support a means for transmitting, to one or more UEs via RRC signaling and based on the determining to employ the NES mode, configuration information associated with a CHO from the source cell to a target cell, where the CHO is associated with the NES mode. The F1AP transmission component 835 is capable of, configured to, or operable to support a means for transmitting, to a second network entity that serves the one or more UEs via the source cell and based on the determining to employ the NES mode, a first indication of the one or more UEs configured for the CHO. The F1AP transmission component 835 is capable of, configured to, or operable to support a means for transmitting, to the second network entity, a second indication of at least a subset of the one or more UEs that are to perform the CHO.

Additionally, or alternatively, the communications manager 820 may support wireless communications at a first network entity associated with a source cell in accordance with examples as disclosed herein. The F1AP reception component 840 is capable of, configured to, or operable to support a means for receiving, from a second network entity associated with the source cell, a first indication of one or more UEs served by the first network entity that are configured, by the second network entity, for a CHO from the source cell to a target cell, where the CHO is associated with a NES mode of the source cell. The F1AP reception component 840 is capable of, configured to, or operable to support a means for receiving, from the second network entity, a second indication of at least a subset of the one or more UEs that are to perform the CHO. The L1 transmission component 845 is capable of, configured to, or operable to support a means for transmitting a signal indicating to initiate the CHO to the at least the subset of the one or more UEs.

Figure 9:
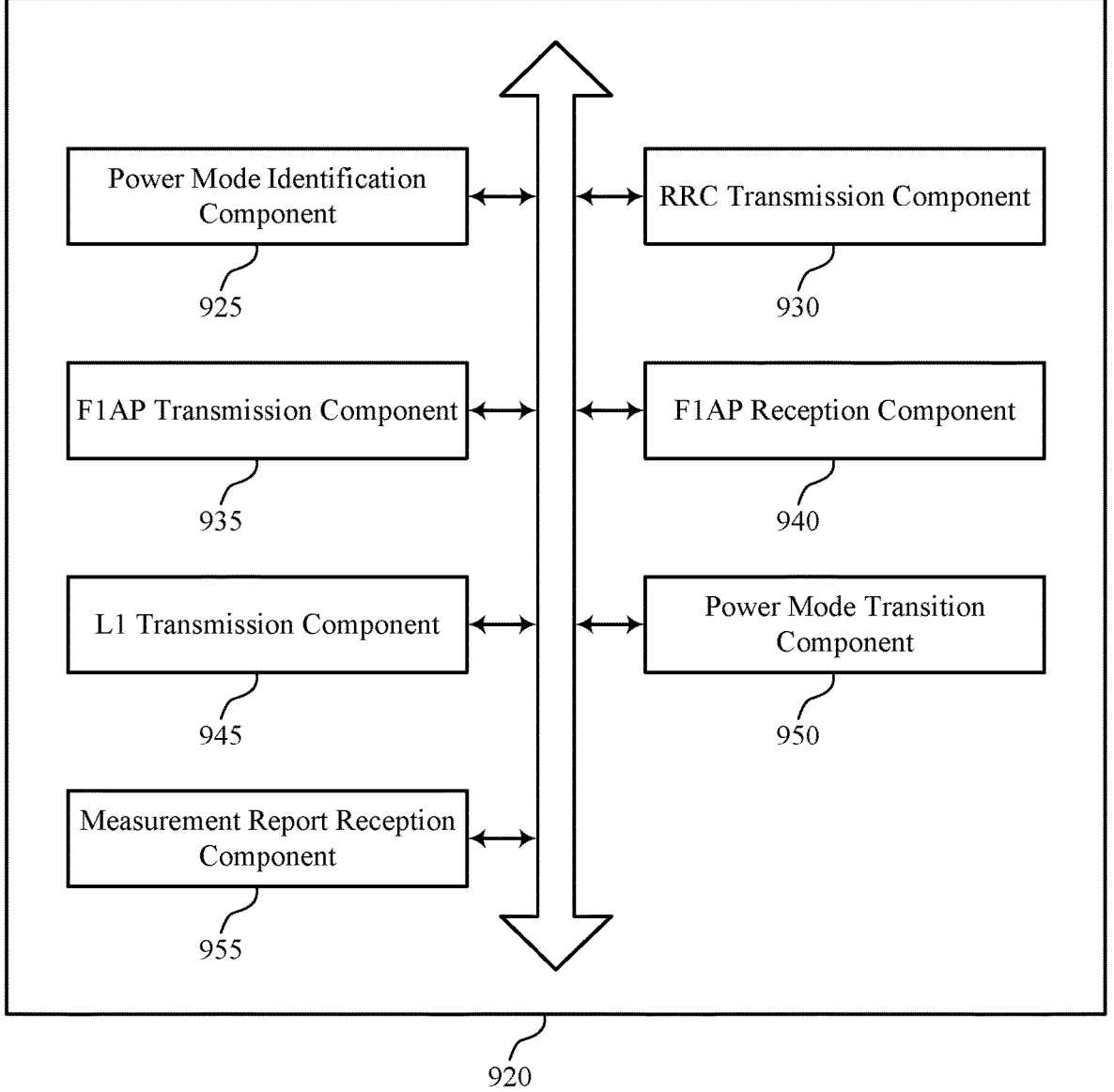
FIG. 9 shows a block diagram of a communications manager that supports disaggregated network entity signaling for NES CHO in accordance with one or more aspects of the present disclosure.

FIG. 9 shows a block diagram 900 of a communications manager 920 that supports disaggregated network entity signaling for NES CHO in accordance with one or more aspects of the present disclosure. The communications manager 920 may be an example of aspects of a communications manager 720, a communications manager 820, or both, as described herein. The communications manager 920, or various components thereof, may be an example of means for performing various aspects of disaggregated network entity signaling for NES CHO as described herein. For example, the communications manager 920 may include a power mode identification component 925, an RRC transmission component 930, a F1AP transmission component 935, a F1AP reception component 940, a L1 transmission component 945, a power mode transition component 950, a measurement report reception component 955, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 920 may support wireless communications at a first network entity associated with a source cell in accordance with examples as disclosed herein. The power mode identification component 925 is capable of, configured to, or operable to support a means for determining to employ a NES mode at the source cell. The RRC transmission component 930 is capable of, configured to, or operable to support a means for transmitting, to one or more UEs via RRC signaling and based on the determining to employ the NES mode, configuration information associated with a CHO from the source cell to a target cell, where the CHO is associated with the NES mode. The F1AP transmission component 935 is capable of, configured to, or operable to support a means for transmitting, to a second network entity that serves the one or more UEs via the source cell and based on the determining to employ the NES mode, a first indication of the one or more UEs configured for the CHO. In some examples, the F1AP transmission component 935 is capable of, configured to, or operable to support a means for transmitting, to the second network entity, a second indication of at least a subset of the one or more UEs that are to perform the CHO.

In some examples, the first indication includes a list of the one or more UEs, a flag indicating that at least one UE served by the second network entity is configured for the CHO, an indication of the target cell, one or more groupings of the one or more UEs, a value associated with a time to perform the CHO, or any combination thereof.

In some examples, the configuration information indicates a first threshold value for one or more signal measurements and a second threshold value for one or more signal measurements.

In some examples, the measurement report reception component 955 is capable of, configured to, or operable to support a means for receiving one or more measurement reports associated with the one or more UEs, where the subset of the one or more UEs includes at least one UE associated with a measurement report that satisfies the first threshold value.

In some examples, the first threshold value is associated with the CHO that is associated with the NES mode and the second threshold value is associated with a second CHO that is not associated with the NES mode.

In some examples, the configuration information indicates a threshold value for one or more signal measurements and a flag indicating to delay the CHO until reception of a signal indicating to initiate the CHO.

In some examples, the subset of the one or more UEs is determined based on a selection by the first network entity, one or more measurements obtained by the first network entity, or both, and the second indication includes the signal indicating to initiate the CHO.

In some examples, to support transmitting the configuration information, the RRC transmission component 930 is capable of, configured to, or operable to support a means for transmitting, at a first time, the configuration information via the RRC signaling. In some examples, to support transmitting the configuration information, the F1AP transmission component 935 is capable of, configured to, or operable to support a means for transmitting, at the first time or after the first time, the first indication via an F1 interface.

In some examples, the F1AP transmission component 935 is capable of, configured to, or operable to support a means for transmitting, to the second network entity, a third indication including a modification of the first indication or a cancellation of the first indication.

In some examples, the power mode transition component 950 is capable of, configured to, or operable to support a means for transitioning from a first power state to a second power state based on transmitting the second indication, where the second power state is the NES mode that uses less power than the first power state.

Additionally, or alternatively, the communications manager 920 may support wireless communications at a first network entity associated with a source cell in accordance with examples as disclosed herein. The F1AP reception component 940 is capable of, configured to, or operable to support a means for receiving, from a second network entity associated with the source cell, a first indication of one or more UEs served by the first network entity that are configured, by the second network entity, for a CHO from the source cell to a target cell, where the CHO is associated with a NES mode of the source cell. In some examples, the F1AP reception component 940 is capable of, configured to, or operable to support a means for receiving, from the second network entity, a second indication of at least a subset of the one or more UEs that are to perform the CHO. The L1 transmission component 945 is capable of, configured to, or operable to support a means for transmitting a signal indicating to initiate the CHO to the at least the subset of the one or more UEs.

In some examples, the first indication includes a list of the one or more UEs, a flag indicating that at least one UE served by the first network entity is configured for the CHO, an indication of the target cell, one or more groupings of the one or more UEs a value associated with a time to perform the CHO, or any combination thereof.

In some examples, to support receiving the second indication, the F1AP reception component 940 is capable of, configured to, or operable to support a means for receiving the second indication from the second network entity, where the subset of the one or more UEs is determined based on a selection by the first network entity, one or more measurements obtained by the first network entity, or both, and the second indication includes the signal indicating to initiate the CHO.

In some examples, to support receiving the second indication, the measurement report reception component 955 is capable of, configured to, or operable to support a means for receiving one or more measurement reports from the one or more UEs, where the subset of the one or more UEs includes at least one UE associated with a measurement report that satisfies a threshold value.

In some examples, the threshold value is associated with a second CHO that is not associated with the NES mode.

In some examples, to support transmitting the signal indicating to initiate the CHO, the L1 transmission component 945 is capable of, configured to, or operable to support a means for transmitting, via a unicast channel, a respective message to each UE of the one or more UEs including the trigger, each respective message associated with a RNTI for a corresponding UE. In some examples, to support transmitting the signal indicating to initiate the CHO, the L1 transmission component 945 is capable of, configured to, or operable to support a means for transmitting, via a groupcast channel, a message to the one or more UEs including the trigger, the message associated with a group RNTI for the one or more UEs.

In some examples, the power mode transition component 950 is capable of, configured to, or operable to support a means for transitioning from a first power state to a second power state based on transmitting the signal indicating to initiate the CHO, where the second power state is the NES mode that uses less power than the first power state.

Figure 10:
FIG. 10 shows a diagram of a system including a device that supports disaggregated network entity signaling for NES CHO in accordance with one or more aspects of the present disclosure.

FIG. 10 shows a diagram of a system 1000 including a device 1005 that supports disaggregated network entity signaling for NES CHO in accordance with one or more aspects of the present disclosure. The device 1005 may be an example of or include the components of a device 705, a device 805, or a network entity 105 as described herein. The device 1005 may communicate with one or more network entities 105, one or more UEs 115, or any combination thereof, which may include communications over one or more wired interfaces, over one or more wireless interfaces, or any combination thereof. The device 1005 may include components that support outputting and obtaining communications, such as a communications manager 1020, a transceiver 1010, an antenna 1015, a memory 1025, code 1030, and a processor 1035. These components may be in electronic communication or otherwise coupled (e.g., operatively, communicatively, functionally, electronically, electrically) via one or more buses (e.g., a bus 1040).

The transceiver 1010 may support bi-directional communications via wired links, wireless links, or both as described herein. In some examples, the transceiver 1010 may include a wired transceiver and may communicate bi-directionally with another wired transceiver. Additionally, or alternatively, in some examples, the transceiver 1010 may include a wireless transceiver and may communicate bi-directionally with another wireless transceiver. In some examples, the device 1005 may include one or more antennas 1015, which may be capable of transmitting or receiving wireless transmissions (e.g., concurrently). The transceiver 1010 may also include a modem to modulate signals, to provide the modulated signals for transmission (e.g., by one or more antennas 1015, by a wired transmitter), to receive modulated signals (e.g., from one or more antennas 1015, from a wired receiver), and to demodulate signals. In some implementations, the transceiver 1010 may include one or more interfaces, such as one or more interfaces coupled with the one or more antennas 1015 that are configured to support various receiving or obtaining operations, or one or more interfaces coupled with the one or more antennas 1015 that are configured to support various transmitting or outputting operations, or a combination thereof. In some implementations, the transceiver 1010 may include or be configured for coupling with one or more processors or memory components that are operable to perform or support operations based on received or obtained information or signals, or to generate information or other signals for transmission or other outputting, or any combination thereof. In some implementations, the transceiver 1010, or the transceiver 1010 and the one or more antennas 1015, or the transceiver 1010 and the one or more antennas 1015 and one or more processors or memory components (for example, the processor 1035, or the memory 1025, or both), may be included in a chip or chip assembly that is installed in the device 1005. In some examples, the transceiver may be operable to support communications via one or more communications links (e.g., a communication link 125, a backhaul communication link 120, a midhaul communication link 162, a fronthaul communication link 168).

The memory 1025 may include RAM and ROM. The memory 1025 may store computer-readable, computer-executable code 1030 including instructions that, when executed by the processor 1035, cause the device 1005 to perform various functions described herein. The code 1030 may be stored in a non-transitory computer-readable medium such as system memory or another type of memory. In some cases, the code 1030 may not be directly executable by the processor 1035 but may cause a computer (e.g., when compiled and executed) to perform functions described herein. In some cases, the memory 1025 may contain, among other things, a BIOS which may control basic hardware or software operation such as the interaction with peripheral components or devices.

The processor 1035 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1035 may be configured to operate a memory array using a memory controller. In some other cases, a memory controller may be integrated into the processor 1035. The processor 1035 may be configured to execute computer-readable instructions stored in a memory (e.g., the memory 1025) to cause the device 1005 to perform various functions (e.g., functions or tasks supporting disaggregated network entity signaling for NES CHO). For example, the device 1005 or a component of the device 1005 may include a processor 1035 and memory 1025 coupled with the processor 1035, the processor 1035 and memory 1025 configured to perform various functions described herein. The processor 1035 may be an example of a cloud-computing platform (e.g., one or more physical nodes and supporting software such as operating systems, virtual machines, or container instances) that may host the functions (e.g., by executing code 1030) to perform the functions of the device 1005. The processor 1035 may be any one or more suitable processors capable of executing scripts or instructions of one or more software programs stored in the device 1005 (such as within the memory 1025). In some implementations, the processor 1035 may be a component of a processing system. A processing system may generally refer to a system or series of machines or components that receives inputs and processes the inputs to produce a set of outputs (which may be passed to other systems or components of, for example, the device 1005). For example, a processing system of the device 1005 may refer to a system including the various other components or subcomponents of the device 1005, such as the processor 1035, or the transceiver 1010, or the communications manager 1020, or other components or combinations of components of the device 1005. The processing system of the device 1005 may interface with other components of the device 1005, and may process information received from other components (such as inputs or signals) or output information to other components. For example, a chip or modem of the device 1005 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1005 may transmit information output from the chip or modem. Additionally, or alternatively, in some implementations, the one or more interfaces may refer to an interface between the processing system of the chip or modem and a receiver, such that the device 1005 may obtain information or signal inputs, and the information may be passed to the processing system. A person having ordinary skill in the art will readily recognize that a first interface also may obtain information or signal inputs, and a second interface also may output information or signal outputs.

In some examples, a bus 1040 may support communications of (e.g., within) a protocol layer of a protocol stack. In some examples, a bus 1040 may support communications associated with a logical channel of a protocol stack (e.g., between protocol layers of a protocol stack), which may include communications performed within a component of the device 1005, or between different components of the device 1005 that may be co-located or located in different locations (e.g., where the device 1005 may refer to a system in which one or more of the communications manager 1020, the transceiver 1010, the memory 1025, the code 1030, and the processor 1035 may be located in one of the different components or divided between different components).

In some examples, the communications manager 1020 may manage aspects of communications with a core network 130 (e.g., via one or more wired or wireless backhaul links). For example, the communications manager 1020 may manage the transfer of data communications for client devices, such as one or more UEs 115. In some examples, the communications manager 1020 may manage communications with other network entities 105, and may include a controller or scheduler for controlling communications with UEs 115 in cooperation with other network entities 105. In some examples, the communications manager 1020 may support an X2 interface within an LTE/LTE-A wireless communications network technology to provide communication between network entities 105.

The communications manager 1020 may support wireless communications at a first network entity associated with a source cell in accordance with examples as disclosed herein. For example, the communications manager 1020 is capable of, configured to, or operable to support a means for determining to employ a NES mode at the source cell. The communications manager 1020 is capable of, configured to, or operable to support a means for transmitting, to one or more UEs via RRC signaling and based on the determining to employ the NES mode, configuration information associated with a CHO from the source cell to a target cell, where the CHO is associated with the NES mode. The communications manager 1020 is capable of, configured to, or operable to support a means for transmitting, to a second network entity that serves the one or more UEs via the source cell and based on the determining to employ the NES mode, a first indication of the one or more UEs configured for the CHO. The communications manager 1020 is capable of, configured to, or operable to support a means for transmitting, to the second network entity, a second indication of at least a subset of the one or more UEs that are to perform the CHO.

Additionally, or alternatively, the communications manager 1020 may support wireless communications at a first network entity associated with a source cell in accordance with examples as disclosed herein. For example, the communications manager 1020 is capable of, configured to, or operable to support a means for receiving, from a second network entity associated with the source cell, a first indication of one or more UEs served by the first network entity that are configured, by the second network entity, for a CHO from the source cell to a target cell, where the CHO is associated with a NES mode of the source cell. The communications manager 1020 is capable of, configured to, or operable to support a means for receiving, from the second network entity, a second indication of at least a subset of the one or more UEs that are to perform the CHO. The communications manager 1020 is capable of, configured to, or operable to support a means for transmitting a signal indicating to initiate the CHO to the at least the subset of the one or more UEs.

By including or configuring the communications manager 1020 in accordance with examples as described herein, the device 1005 may support techniques for reduced power consumption and an increased reliability for a handover procedure.

In some examples, the communications manager 1020 may be configured to perform various operations (e.g., receiving, obtaining, monitoring, outputting, transmitting)

using or otherwise in cooperation with the transceiver 1010, the one or more antennas 1015 (e.g., where applicable), or any combination thereof. Although the communications manager 1020 is illustrated as a separate component, in some examples, one or more functions described with reference to the communications manager 1020 may be supported by or performed by the transceiver 1010, the processor 1035, the memory 1025, the code 1030, or any combination thereof. For example, the code 1030 may include instructions executable by the processor 1035 to cause the device 1005 to perform various aspects of disaggregated network entity signaling for NES CHO as described herein, or the processor 1035 and the memory 1025 may be otherwise configured to perform or support such operations.

FIG. 11 shows a flowchart illustrating a method 1100 that supports disaggregated network entity signaling for NES CHO in accordance with aspects of the present disclosure. The operations of the method 1100 may be implemented by a network entity or its components as described herein. For example, the operations of the method 1100 may be performed by a network entity as described with reference to FIGS. 1 through 10. In some examples, a network entity may execute a set of instructions to control the functional elements of the wireless network entity to perform the described functions. Additionally, or alternatively, the wireless network entity may perform aspects of the described functions using special-purpose hardware.

At 1105, the method may include determining to employ a NES mode at the source cell. The operations of 1105 may be performed in accordance with examples as disclosed herein. In some examples, aspects of the operations of 1105 may be performed by a power mode identification component 925 as described with reference to FIG. 9.

At 1110, the method may include transmitting, to one or more UEs via RRC signaling and based on the determining to employ the NES mode, configuration information associated with a CHO from the source cell to a target cell, where the CHO is associated with the NES mode. The operations of 1110 may be performed in accordance with examples as disclosed herein. In some examples, aspects of the operations of 1110 may be performed by an RRC transmission component 930 as described with reference to FIG. 9.

At 1115, the method may include transmitting, to a second network entity that serves the one or more UEs via the source cell and based on the determining to employ the NES mode, a first indication of the one or more UEs configured for the CHO. The operations of 1115 may be performed in accordance with examples as disclosed herein. In some examples, aspects of the operations of 1115 may be performed by a F1AP transmission component 935 as described with reference to FIG. 9.

At 1120, the method may include transmitting, to the second network entity, a second indication of at least a subset of the one or more UEs that are to perform the CHO. The operations of 1120 may be performed in accordance with examples as disclosed herein. In some examples, aspects of the operations of 1120 may be performed by a F1AP transmission component 935 as described with reference to FIG. 9.

FIG. 12 shows a flowchart illustrating a method 1200 that supports disaggregated network entity signaling for NES CHO in accordance with aspects of the present disclosure. The operations of the method 1200 may be implemented by a network entity or its components as described herein. For example, the operations of the method 1200 may be performed by a network entity as described with reference to FIGS. 1 through 10. In some examples, a network entity may execute a set of instructions to control the functional elements of the wireless network entity to perform the described functions. Additionally, or alternatively, the wireless network entity may perform aspects of the described functions using special-purpose hardware.

At 1205, the method may include receiving, from a second network entity associated with the source cell, a first indication of one or more UEs served by the first network entity that are configured, by the first network entity, for a CHO from the source cell to a target cell, where the CHO is associated with a NES mode of the source cell. The operations of 1205 may be performed in accordance with examples as disclosed herein. In some examples, aspects of the operations of 1205 may be performed by a F1AP reception component 940 as described with reference to FIG. 9.

At 1210, the method may include receiving, from the second network entity, a second indication of at least a subset of the one or more UEs that are to perform the CHO. The operations of 1210 may be performed in accordance with examples as disclosed herein. In some examples, aspects of the operations of 1210 may be performed by a F1AP reception component 940 as described with reference to FIG. 9.

At 1215, the method may include transmitting a signal indicating to initiate the CHO to the at least the subset of the one or more UEs. The operations of 1215 may be performed in accordance with examples as disclosed herein. In some examples, aspects of the operations of 1215 may be performed by a L1 transmission component 945 as described with reference to FIG. 9.

The following provides an overview of aspects of the present disclosure:

Aspect 1: A method for wireless communications at a first network entity associated with a source cell, comprising: determining to employ a NES mode at the source cell; transmitting, to one or more UEs via RRC signaling and based at least in part on the determining to employ the NES mode, configuration information associated with a CHO from the source cell to a target cell, wherein the CHO is associated with the NES mode; transmitting, to a second network entity that serves one or more UEs via the source cell and based at least in part on the determining to employ the NES mode, a first indication of the one or more UEs configured for the CHO; and transmitting, to the second network entity, a second indication of at least a subset of the one or more UEs that are to perform the CHO.

Aspect 2: The method of aspect 1, wherein the first indication comprises a list of the one or more UEs, a flag indicating that at least one UE served by the second network entity is configured for the CHO, an indication of the target cell, one or more groupings of the one or more UEs, a value associated with a time to perform the CHO, or any combination thereof.

Aspect 3: The method of any of aspects 1 through 2, wherein the configuration information indicates a first threshold value for one or more signal measurements and a second threshold value for one or more signal measurements.

Aspect 4: The method of aspect 3, further comprising: receiving one or more measurement reports associated with the one or more UEs, wherein the subset of the one or more UEs comprises at least one UE associated with a measurement report that satisfies the first threshold value.

Aspect 5: The method of aspect 4, wherein the first threshold value is associated with the CHO that is associated with the NES mode and the second threshold value is associated with a second CHO that is not associated with the NES mode.

Aspect 6: The method of any of aspects 1 through 2, wherein the configuration information indicates a threshold value for one or more signal measurements and a flag indicating to delay the CHO until reception of a signal indicating to initiate the CHO.

Aspect 7: The method of aspect 6, wherein the subset of the one or more UEs is determined based at least in part on a selection by the first network entity, one or more measurements obtained by the first network entity, or both, and the second indication comprises the signal indicating to initiate the CHO.

Aspect 8: The method of any of aspects 1 through 7, wherein transmitting the configuration information comprises: transmitting, at a first time, the configuration information via the RRC signaling; and transmitting, at the first time or after the first time, the first indication via an F1 interface.

Aspect 9: The method of any of aspects 1 through 8, further comprising: transmitting, to the second network entity, a third indication comprising a modification of the first indication or a cancellation of the first indication.

Aspect 10: The method of any of aspects 1 through 9, further comprising: transitioning from a first power state to a second power state based at least in part on transmitting the second indication, wherein the second power state is the NES mode that uses less power than the first power state.

Aspect 11: A method for wireless communications at a first network entity associated with a source cell, comprising: receiving, from a second network entity associated with the source cell, a first indication of one or more UEs served by the first network entity that are configured, by the first network entity, for a CHO from the source cell to a target cell, wherein the CHO is associated with a NES mode of the source cell; receiving, from the second network entity, a second indication of at least a subset of the one or more UEs that are to perform the CHO; and transmitting a signal indicating to initiate the CHO to the at least the subset of the one or more UEs.

Aspect 12: The method of aspect 11, wherein the first indication comprises a list of the one or more UEs, a flag indicating that at least one UE served by the first network entity is configured for the CHO, an indication of the target cell, one or more groupings of the one or more UEs a value associated with a time to perform the CHO, or any combination thereof.

Aspect 13: The method of any of aspects 11 through 12, wherein receiving the second indication comprises: receiving the second indication from the second network entity, wherein the subset of the one or more UEs is determined based at least in part on a selection by the first network entity, one or more measurements obtained by the first network entity, or both, and the second indication comprises the signal indicating to initiate the CHO.

Aspect 14: The method of aspect 11, wherein receiving the second indication comprises: receiving one or more measurement reports from the one or more UEs, wherein the subset of the one or more UEs comprises at least one UE associated with a measurement report that satisfies a threshold value.

Aspect 15: The method of aspect 14, wherein the threshold value is associated with a second CHO that is not associated with the NES mode.

Aspect 16: The method of any of aspects 11 through 15, wherein transmitting the signal indicating to initiate the CHO comprises: transmitting, via a unicast channel, a respective message to each UE of the one or more UEs comprising the trigger, each respective message associated with a RNTI for a corresponding UE; or transmitting, via a groupcast channel, a message to the one or more UEs comprising the trigger, the message associated with a group RNTI for the one or more UEs.

Aspect 17: The method of any of aspects 11 through 16, further comprising: transitioning from a first power state to a second power state based at least in part on transmitting the signal indicating to initiate the CHO, wherein the second power state is the NES mode that uses less power than the first power state.

Aspect 18: An apparatus for wireless communications at a first network entity associated with a source cell, comprising a processor; memory coupled with the processor; and instructions stored in the memory and executable by the processor to cause the apparatus to perform a method of any of aspects 1 through 10.

Aspect 19: An apparatus for wireless communications at a first network entity associated with a source cell, comprising at least one means for performing a method of any of aspects 1 through 10.

Aspect 20: A non-transitory computer-readable medium storing code for wireless communications at a first network entity associated with a source cell, the code comprising instructions executable by a processor to perform a method of any of aspects 1 through 10.

Aspect 21: An apparatus for wireless communications at a first network entity associated with a source cell, comprising a processor; memory coupled with the processor; and instructions stored in the memory and executable by the processor to cause the apparatus to perform a method of any of aspects 11 through 17.

Aspect 22: An apparatus for wireless communications at a first network entity associated with a source cell, comprising at least one means for performing a method of any of aspects 11 through 17.

Aspect 23: A non-transitory computer-readable medium storing code for wireless communications at a first network entity associated with a source cell, the code comprising instructions executable by a processor to perform a method of any of aspects 11 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first network entity associated with a source cell, comprising:
a processor;
memory coupled with the processor; and
instructions stored in the memory and executable by the processor to cause the apparatus to:
determine to employ a network energy savings mode at the source cell;
transmit, to one or more user equipments (UEs) via radio resource control signaling and based at least in part on the determining to employ the network energy savings mode, configuration information associated with a conditional handover from the source cell to a target cell, wherein the conditional handover is associated with the network energy savings mode;
transmit, to a second network entity that serves the one or more UEs via the source cell and based at least in part on the determining to employ the network energy savings mode, a first indication of the one or more UEs configured for the conditional handover; and
transmit, to the second network entity, a second indication of at least a subset of the one or more UEs that are to perform the conditional handover.

2. The apparatus of claim 1, wherein the first indication comprises a list of the one or more UEs, a flag indicating that at least one UE served by the second network entity is configured for the conditional handover, an indication of the target cell, one or more groupings of the one or more UEs, a value associated with a time to perform the conditional handover, or any combination thereof.

3. The apparatus of claim 1, wherein the configuration information indicates a first threshold value for one or more signal measurements and a second threshold value for one or more signal measurements.

4. The apparatus of claim 3, wherein the instructions are further executable by the processor to cause the apparatus to:
receive one or more measurement reports associated with the one or more UEs, wherein the subset of the one or more UEs comprises at least one UE associated with a measurement report that satisfies the first threshold value.

5. The apparatus of claim 4, wherein the first threshold value is associated with the conditional handover that is associated with the network energy savings mode and the second threshold value is associated with a second conditional handover that is not associated with the network energy savings mode.

6. The apparatus of claim 1, wherein the configuration information indicates a threshold value for one or more signal measurements and a flag indicating to delay the conditional handover until reception of a signal indicating to initiate the conditional handover.

7. The apparatus of claim 6, wherein the subset of the one or more UEs is determined based at least in part on a selection by the first network entity, one or more measurements obtained by the first network entity, or both, and the second indication comprises the signal indicating to initiate the conditional handover.

8. The apparatus of claim 1, wherein the instructions to transmit the configuration information are executable by the processor to cause the apparatus to:
transmit, at a first time, the configuration information via the radio resource control signaling; and
transmit, at the first time or after the first time, the first indication via an F1 interface.

9. The apparatus of claim 1, wherein the instructions are further executable by the processor to cause the apparatus to:
transmit, to the second network entity, a third indication comprising a modification of the first indication or a cancellation of the first indication.

10. The apparatus of claim 1, wherein the instructions are further executable by the processor to cause the apparatus to:
transition from a first power state to a second power state based at least in part on transmitting the second indication, wherein the second power state is the network energy savings mode that uses less power than the first power state.

11. An apparatus for wireless communications at a first network entity associated with a source cell, comprising:

a processor;

memory coupled with the processor; and instructions stored in the memory and executable by the processor to cause the apparatus to:

receive, from a second network entity associated with the source cell, a first indication of one or more user equipments (UEs) served by the first network entity that are configured, by the second network entity, for a conditional handover from the source cell to a target cell, wherein the conditional handover is associated with a network energy savings mode of the source cell;

receive, from the second network entity, a second indication of at least a subset of the one or more UEs that are to perform the conditional handover; and transmit a signal indicating to initiate the conditional handover to the at least the subset of the one or more UEs.

12. The apparatus of claim 11, wherein the first indication comprises a list of the one or more UEs, a flag indicating that at least one UE served by the first network entity is configured for the conditional handover, an indication of the target cell, one or more groupings of the one or more UEs, a value associated with a time to perform the conditional handover, or any combination thereof.

13. The apparatus of claim 11, wherein the instructions to receive the second indication are executable by the processor to cause the apparatus to:

receive the second indication from the second network entity, wherein the subset of the one or more UEs is determined based at least in part on a selection by the first network entity, one or more measurements obtained by the first network entity, or both, and the second indication comprises the signal indicating to initiate the conditional handover.

14. The apparatus of claim 11, wherein the instructions to receive the second indication are executable by the processor to cause the apparatus to:

receive one or more measurement reports from the one or more UEs, wherein the subset of the one or more UEs comprises at least one UE associated with a measurement report that satisfies a threshold value.

15. The apparatus of claim 14, wherein the threshold value is associated with a second conditional handover that is not associated with the network energy savings mode.

16. The apparatus of claim 11, wherein the instructions to transmit the signal indicating to initiate the conditional handover are executable by the processor to cause the apparatus to:

transmit, via a unicast channel, a respective message to each UE of the one or more UEs comprising the trigger, each respective message associated with a radio network temporary identifier for a corresponding UE; or transmit, via a groupcast channel, a message to the one or more UEs comprising the trigger, the message associated with a group radio network temporary identifier for the one or more UEs.

17. The apparatus of claim 11, wherein the instructions are further executable by the processor to cause the apparatus to:

transition from a first power state to a second power state based at least in part on transmitting the signal indicating to initiate the conditional handover, wherein the second power state is the network energy savings mode that uses less power than the first power state.

18. A method for wireless communications at a first network entity associated with a source cell, comprising:

determining to employ a network energy savings mode at the source cell;

transmitting, to one or more user equipments (UEs) via radio resource control signaling and based at least in part on the determining to employ the network energy savings mode, configuration information associated with a conditional handover from the source cell to a target cell, wherein the conditional handover is associated with the network energy savings mode;

transmitting, to a second network entity that serves the one or more UEs via the source cell and based at least in part on the determining to employ the network energy savings mode, a first indication of the one or more UEs configured for the conditional handover; and transmitting, to the second network entity, a second indication of at least a subset of the one or more UEs that are to perform the conditional handover.

19. The method of claim 18, wherein the first indication comprises a list of the one or more UEs, a flag indicating that at least one UE served by the second network entity is configured for the conditional handover, an indication of the target cell, one or more groupings of the one or more UEs, a value associated with a time to perform the conditional handover, or any combination thereof.

20. The method of claim 18, wherein the configuration information indicates a first threshold value for one or more signal measurements and a second threshold value for one or more signal measurements.

21. The method of claim 20, further comprising:

receiving one or more measurement reports associated with the one or more UEs, wherein the subset of the one or more UEs comprises at least one UE associated with a measurement report that satisfies the first threshold value.

22. The method of claim 21, wherein the first threshold value is associated with the conditional handover that is associated with the network energy savings mode and the second threshold value is associated with a second conditional handover that is not associated with the network energy savings mode.

23. The method of claim 18, wherein the configuration information indicates a threshold value for one or more signal measurements and a flag indicating to delay the conditional handover until reception of a signal indicating to initiate the conditional handover.

24. The method of claim 23, wherein the subset of the one or more UEs is determined based at least in part on a selection by the first network entity, one or more measurements obtained by the first network entity, or both, and the second indication comprises the signal indicating to initiate the conditional handover.

25. The method of claim 18, wherein transmitting the configuration information comprises:

transmitting, at a first time, the configuration information via the radio resource control signaling; and transmitting, at the first time or after the first time, the first indication via an F1 interface.

26. The method of claim 18, further comprising:

transmitting, to the second network entity, a third indication comprising a modification of the first indication or a cancellation of the first indication.

27. The method of claim 18, further comprising:

transitioning from a first power state to a second power state based at least in part on transmitting the second indication, wherein the second power state is the network energy savings mode that uses less power than the first power state.

28. A method for wireless communications at a first network entity associated with a source cell, comprising:

receiving, from a second network entity associated with the source cell, a first indication of one or more user equipments (UEs) served by the first network entity that are configured, by the second network entity, for a conditional handover from the source cell to a target cell, wherein the conditional handover is associated with a network energy savings mode of the source cell;

receiving, from the second network entity, a second indication of at least a subset of the one or more UEs that are to perform the conditional handover; and transmitting a signal indicating to initiate the conditional handover to the at least the subset of the one or more UEs.

29. The method of claim 28, wherein the first indication comprises a list of the one or more UEs, a flag indicating that at least one UE served by the first network entity is configured for the conditional handover, an indication of the target cell, one or more groupings of the one or more UEs, a value associated with a time to perform the conditional handover, or any combination thereof.

30. The method of claim 28, wherein receiving the second indication comprises:

receiving the second indication from the second network entity, wherein the subset of the one or more UEs is determined based at least in part on a selection by the first network entity, one or more measurements obtained by the first network entity, or both, and the second indication comprises the signal indicating to initiate the conditional handover.

\* \* \* \* \*